United States Patent
Amihood et al.

(10) Patent No.: US 10,908,696 B2
(45) Date of Patent: **\*Feb. 2, 2021**

(54) ADVANCED GAMING AND VIRTUAL REALITY CONTROL USING RADAR

(71) Applicant: Google LLC, Mountain View, CA (US)

(72) Inventors: Patrick M. Amihood, Palo Alto, CA (US); Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,245

(22) Filed: Apr. 10, 2019

(65) Prior Publication Data
US 2019/0232156 A1 Aug. 1, 2019

Related U.S. Application Data

(63) Continuation of application No. 15/286,495, filed on Oct. 5, 2016, now Pat. No. 10,300,370.
(Continued)

(51) Int. Cl.
*G01S 13/04* (2006.01)
*G06F 3/01* (2006.01)
(Continued)

(52) U.S. Cl.
CPC .............. *G06F 3/017* (2013.01); *A63F 13/21* (2014.09); *A63F 13/24* (2014.09); *G01S 7/41* (2013.01); *G01S 13/66* (2013.01); *G01S 13/867* (2013.01); *G01S 13/88* (2013.01); *G01S 13/90* (2013.01); *G06F 3/011* (2013.01); *G06F 3/04815* (2013.01); *G06F 16/245* (2019.01); *G06F 21/32* (2013.01); *G06F 21/6245* (2013.01); *G06K 9/00201* (2013.01); *G06K 9/629* (2013.01); *G06K 9/6288* (2013.01); *H04Q 9/00* (2013.01); *A63F 2300/8082* (2013.01); *G01S 13/865* (2013.01); *G01S 13/931* (2013.01);
(Continued)

(58) Field of Classification Search
CPC ........ A63F 13/21; A63F 13/24; G01S 13/867; G01S 13/86; G01S 13/42; G01S 13/89
USPC ......................................................... 463/37
See application file for complete search history.

(56) References Cited

U.S. PATENT DOCUMENTS

3,610,874 A 10/1971 Gagliano
3,752,017 A 8/1973 Lloyd et al.
(Continued)

FOREIGN PATENT DOCUMENTS

CN 1299501 6/2001
CN 1462382 12/2003
(Continued)

OTHER PUBLICATIONS

"Advisory Action", U.S. Appl. No. 14/504,139, dated Aug. 28, 2017, 3 pages.
(Continued)

*Primary Examiner* — Michael A Cuff
(74) *Attorney, Agent, or Firm* — Colby Nipper PLLC

(57) ABSTRACT

Techniques are described herein that enable advanced gaming and virtual reality control using radar. These techniques enable small motions and displacements to be tracked, even in the millimeter or submillimeter scale, for user control actions even when those actions are optically occluded or obscured.

20 Claims, 7 Drawing Sheets

Related U.S. Application Data

(60) Provisional application No. 62/237,975, filed on Oct. 6, 2015.

(51) Int. Cl.

| | | |
|---|---|---|
| *G01S 13/86* | (2006.01) | |
| *H04Q 9/00* | (2006.01) | |
| *G06K 9/00* | (2006.01) | |
| *G06K 9/62* | (2006.01) | |
| *G01S 13/88* | (2006.01) | |
| *G06F 21/32* | (2013.01) | |
| *G06F 3/0481* | (2013.01) | |
| *G01S 7/41* | (2006.01) | |
| *G06F 16/245* | (2019.01) | |
| *G01S 13/90* | (2006.01) | |
| *G06F 21/62* | (2013.01) | |
| *A63F 13/21* | (2014.01) | |
| *A63F 13/24* | (2014.01) | |
| *G01S 13/66* | (2006.01) | |
| *G08C 17/02* | (2006.01) | |
| *G06T 7/73* | (2017.01) | |
| *G01S 13/931* | (2020.01) | |
| *G06F 1/16* | (2006.01) | |
| *G06F 3/0484* | (2013.01) | |
| *G01S 19/42* | (2010.01) | |
| *G06F 3/0346* | (2013.01) | |
| *G06F 3/16* | (2006.01) | |

(52) U.S. Cl.
CPC ....... *G01S 19/42* (2013.01); *G01S 2013/9322* (2020.01); *G06F 1/163* (2013.01); *G06F 3/0346* (2013.01); *G06F 3/0484* (2013.01); *G06F 3/165* (2013.01); *G06F 2203/0384* (2013.01); *G06F 2221/2105* (2013.01); *G06T 7/75* (2017.01); *G08C 17/02* (2013.01); *G08C 2201/93* (2013.01); *H04Q 2209/883* (2013.01)

(56) References Cited

U.S. PATENT DOCUMENTS

| | | |
|---|---|---|
| 3,953,706 A | 4/1976 | Harris et al. |
| 4,104,012 A | 8/1978 | Ferrante |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,121,124 A | 6/1992 | Spivey et al. |
| 5,298,715 A | 3/1994 | Chalco et al. |
| 5,341,979 A | 8/1994 | Gupta |
| 5,410,471 A | 4/1995 | Alyfuku et al. |
| 5,468,917 A | 11/1995 | Brodsky et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,037,893 A | 3/2000 | Lipman |
| 6,080,690 A | 6/2000 | Lebby et al. |
| 6,101,431 A | 8/2000 | Niwa et al. |
| 6,210,771 B1 | 4/2001 | Post et al. |
| 6,254,544 B1 | 7/2001 | Hayashi |
| 6,313,825 B1 | 11/2001 | Gilbert |
| 6,340,979 B1 | 1/2002 | Beaton et al. |
| 6,380,882 B1 | 4/2002 | Hegnauer |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,833 B2 | 2/2003 | Breed et al. |
| 6,513,970 B1 | 2/2003 | Tabata et al. |
| 6,524,239 B1 | 2/2003 | Reed et al. |
| 6,543,668 B1 | 4/2003 | Fujii et al. |
| 6,616,613 B1 | 9/2003 | Goodman |
| 6,711,354 B2 | 3/2004 | Kameyama |
| 6,717,065 B2 | 4/2004 | Hosaka et al. |
| 6,802,720 B2 | 10/2004 | Weiss et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 6,970,128 B1 | 11/2005 | Dwelly et al. |
| 6,997,882 B1 | 2/2006 | Parker et al. |
| 7,019,682 B1 | 3/2006 | Louberg et al. |
| 7,134,879 B2 | 11/2006 | Sugimoto et al. |
| 7,158,076 B2 | 1/2007 | Fiore et al. |
| 7,164,820 B2 | 1/2007 | Eves et al. |
| 7,194,371 B1 | 3/2007 | McBride et al. |
| 7,205,932 B2 | 4/2007 | Fiore |
| 7,223,105 B2 | 5/2007 | Weiss et al. |
| 7,230,610 B2 | 6/2007 | Jung et al. |
| 7,249,954 B2 | 7/2007 | Weiss |
| 7,266,532 B2 | 9/2007 | Sutton et al. |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,647,093 B2 | 1/2010 | Bojovic et al. |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,791,700 B2 | 9/2010 | Bellamy |
| 7,834,276 B2 | 11/2010 | Chou et al. |
| 7,845,023 B2 | 12/2010 | Swatee |
| 7,941,676 B2 | 5/2011 | Glaser |
| 7,952,512 B1 | 5/2011 | Delker et al. |
| 7,999,722 B2 | 8/2011 | Beeri et al. |
| 8,062,220 B2 | 11/2011 | Kurtz et al. |
| 8,063,815 B2 | 11/2011 | Valo et al. |
| 8,169,404 B1 | 5/2012 | Boillot |
| 8,179,604 B1 | 5/2012 | Prada Gomez et al. |
| 8,193,929 B1 | 6/2012 | Siu et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 | 11/2012 | Oswald et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,475,367 B1 | 7/2013 | Yuen et al. |
| 8,505,474 B2 | 8/2013 | Kang et al. |
| 8,509,882 B2 | 8/2013 | Albert et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,562,526 B2 | 10/2013 | Heneghan et al. |
| 8,569,189 B2 | 10/2013 | Bhattacharya et al. |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,819,812 B1 | 8/2014 | Weber et al. |
| 8,854,433 B1 | 10/2014 | Rafii |
| 8,860,602 B2 | 10/2014 | Nohara et al. |

(56) References Cited

U.S. PATENT DOCUMENTS

| | | |
|---|---|---|
| 8,921,473 B1 | 12/2014 | Hyman |
| 8,948,839 B1 | 2/2015 | Longinotti-Buitoni et al. |
| 9,055,879 B2 | 6/2015 | Selby et al. |
| 9,075,429 B1 | 7/2015 | Karakotsios et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Zhou et al. |
| 9,223,494 B1 | 12/2015 | Desalvo et al. |
| 9,229,102 B1 | 1/2016 | Wright et al. |
| 9,230,160 B1 | 1/2016 | Kanter |
| 9,235,241 B2 | 1/2016 | Newham et al. |
| 9,316,727 B2 | 4/2016 | Sentelle et al. |
| 9,331,422 B2 | 5/2016 | Nazzaro et al. |
| 9,335,825 B2 | 5/2016 | Rautiainen et al. |
| 9,346,167 B2 | 5/2016 | O'Connor et al. |
| 9,354,709 B2 | 5/2016 | Heller et al. |
| 9,508,141 B2 | 11/2016 | Khachaturian et al. |
| 9,511,877 B2 | 12/2016 | Masson |
| 9,569,001 B2 | 2/2017 | Mistry et al. |
| 9,575,560 B2 | 2/2017 | Poupyrev et al. |
| 9,588,625 B2 | 3/2017 | Poupyrev |
| 9,594,443 B2 | 3/2017 | VanBlon et al. |
| 9,600,080 B2 | 3/2017 | Poupyrev |
| 9,693,592 B2 | 7/2017 | Robinson et al. |
| 9,746,551 B2 | 8/2017 | Scholten et al. |
| 9,766,742 B2 | 9/2017 | Papakostas |
| 9,778,749 B2 | 10/2017 | Poupyrev |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,848,780 B1 | 12/2017 | DeBusschere et al. |
| 9,921,660 B2 | 3/2018 | Poupyrev |
| 9,933,908 B2 | 4/2018 | Poupyrev |
| 9,947,080 B2 | 4/2018 | Nguyen et al. |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,016,162 B1 | 7/2018 | Rogers et al. |
| 10,034,630 B2 | 7/2018 | Lee et al. |
| 10,073,590 B2 | 9/2018 | Dascola et al. |
| 10,080,528 B2 | 9/2018 | DeBusschere et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,763 B1 | 2/2019 | Poupyrev et al. |
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 * | 5/2019 | Amihood .............. G06F 21/32 |
| 10,310,620 B2 | 6/2019 | Lien et al. |
| 10,310,621 B1 | 6/2019 | Lien et al. |
| 10,379,621 B2 | 8/2019 | Schwesig et al. |
| 10,401,490 B2 | 9/2019 | Gillian et al. |
| 10,409,385 B2 | 9/2019 | Poupyrev |
| 10,459,080 B1 | 10/2019 | Schwesig et al. |
| 10,492,302 B2 | 11/2019 | Karagozler et al. |
| 10,496,182 B2 | 12/2019 | Lien et al. |
| 10,503,883 B1 | 12/2019 | Gillian et al. |
| 10,509,478 B2 | 12/2019 | Poupyrev et al. |
| 10,540,001 B1 | 1/2020 | Poupyrev et al. |
| 10,572,027 B2 | 2/2020 | Poupyrev et al. |
| 10,579,150 B2 | 3/2020 | Gu et al. |
| 10,642,367 B2 | 5/2020 | Poupyrev |
| 10,660,379 B2 | 5/2020 | Poupyrev et al. |
| 10,664,059 B2 | 5/2020 | Poupyrev |
| 10,664,061 B2 | 5/2020 | Poupyrev |
| 10,705,185 B1 | 7/2020 | Lien et al. |
| 10,768,712 B2 | 9/2020 | Schwesig et al. |
| 10,817,065 B1 | 10/2020 | Lien et al. |
| 10,817,070 B2 | 10/2020 | Lien et al. |
| 10,823,841 B1 | 11/2020 | Lien et al. |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0071750 A1 | 4/2003 | Benitz |
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0009729 A1 | 1/2004 | Hill et al. |
| 2004/0046736 A1 | 3/2004 | Pryor et al. |
| 2004/0102693 A1 | 5/2004 | Jenkins |
| 2004/0157662 A1 * | 8/2004 | Tsuchiya .............. A63F 13/5378 463/32 |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2006/0284757 A1 | 12/2006 | Zemany |
| 2007/0024488 A1 | 2/2007 | Zemany et al. |
| 2007/0026695 A1 | 2/2007 | Lee et al. |
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0074307 A1 | 3/2008 | Boric-Lubecke et al. |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |

(56) References Cited

U.S. PATENT DOCUMENTS

| | | |
|---|---|---|
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0226043 A1 | 9/2009 | Angell et al. |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |
| 2012/0013571 A1 | 1/2012 | Yeh et al. |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0105358 A1 | 5/2012 | Momeyer et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0146950 A1 | 6/2012 | Park et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0193801 A1 | 8/2012 | Gross et al. |
| 2012/0200600 A1* | 8/2012 | Demaine ............... A63F 13/42 345/633 |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0270564 A1 | 10/2012 | Gum et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angellides |
| 2013/0046544 A1 | 2/2013 | Kay et al. |
| 2013/0053653 A1 | 2/2013 | Cuddihy et al. |
| 2013/0076649 A1 | 3/2013 | Myers et al. |
| 2013/0076788 A1 | 3/2013 | Ben Zvi |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0096439 A1 | 4/2013 | Lee et al. |
| 2013/0102217 A1 | 4/2013 | Jeon |
| 2013/0104084 A1 | 4/2013 | Mlyniec et al. |
| 2013/0106710 A1 | 5/2013 | Ashbrook |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0176161 A1 | 7/2013 | Derham et al. |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0222232 A1 | 8/2013 | Kong et al. |
| 2013/0229508 A1 | 9/2013 | Li et al. |
| 2013/0241765 A1 | 9/2013 | Kozma et al. |
| 2013/0245986 A1 | 9/2013 | Grokop et al. |
| 2013/0249793 A1 | 9/2013 | Zhu et al. |
| 2013/0253029 A1 | 9/2013 | Jain et al. |
| 2013/0260630 A1 | 10/2013 | Ito et al. |
| 2013/0263029 A1 | 10/2013 | Rossi et al. |
| 2013/0278499 A1 | 10/2013 | Anderson |
| 2013/0278501 A1 | 10/2013 | Bulzacki |
| 2013/0281024 A1 | 10/2013 | Rofougaran et al. |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0145955 A1 | 5/2014 | Gomez et al. |
| 2014/0149859 A1 | 5/2014 | Van Dyken et al. |

(56) References Cited

U.S. PATENT DOCUMENTS

| | | |
|---|---|---|
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177374 A1 | 6/2015 | Driscoll et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0205358 A1 | 7/2015 | Lyren |
| 2015/0223733 A1 | 8/2015 | Al-Alusi |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0287187 A1 | 10/2015 | Redtel |
| 2015/0301167 A1 | 10/2015 | Sentelle et al. |
| 2015/0312041 A1 | 10/2015 | Choi |
| 2015/0314780 A1 | 11/2015 | Stenneth et al. |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |
| 2015/0346820 A1 | 12/2015 | Poupyrev et al. |
| 2015/0350902 A1 | 12/2015 | Baxley et al. |
| 2015/0351703 A1 | 12/2015 | Phillips et al. |
| 2015/0370250 A1 | 12/2015 | Bachrach et al. |
| 2015/0375339 A1 | 12/2015 | Sterling et al. |
| 2016/0011668 A1 | 1/2016 | Gilad-Bachrach et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0077202 A1 | 3/2016 | Hirvonen et al. |
| 2016/0090839 A1 | 3/2016 | Stolarcyzk |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1 | 6/2016 | Jung |
| 2016/0171293 A1 | 6/2016 | Li et al. |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0234365 A1 | 8/2016 | Alameh et al. |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0287172 A1 | 10/2016 | Morris et al. |
| 2016/0291143 A1 | 10/2016 | Cao et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0168630 A1 | 6/2017 | Khoshkava et al. |
| 2017/0192523 A1 | 7/2017 | Poupyrev |

(56) References Cited

U.S. PATENT DOCUMENTS

| | | | |
|---|---|---|---|
| 2017/0192629 | A1 | 7/2017 | Takada et al. |
| 2017/0196513 | A1 | 7/2017 | Longinotti-Buitoni et al. |
| 2017/0231089 | A1 | 8/2017 | Van Keymeulen |
| 2017/0232538 | A1 | 8/2017 | Robinson et al. |
| 2017/0233903 | A1 | 8/2017 | Jeon |
| 2017/0249033 | A1 | 8/2017 | Podhajny et al. |
| 2017/0322633 | A1 | 11/2017 | Shen et al. |
| 2017/0325337 | A1 | 11/2017 | Karagozler et al. |
| 2017/0325518 | A1 | 11/2017 | Poupyrev et al. |
| 2017/0329412 | A1 | 11/2017 | Schwesig et al. |
| 2017/0329425 | A1 | 11/2017 | Karagozler et al. |
| 2018/0000354 | A1 | 1/2018 | DeBusschere et al. |
| 2018/0000355 | A1 | 1/2018 | DeBusschere et al. |
| 2018/0004301 | A1 | 1/2018 | Poupyrev |
| 2018/0005766 | A1 | 1/2018 | Fairbanks et al. |
| 2018/0046258 | A1 | 2/2018 | Poupyrev |
| 2018/0095541 | A1 | 4/2018 | Gribetz et al. |
| 2018/0106897 | A1 | 4/2018 | Shouldice et al. |
| 2018/0113032 | A1 | 4/2018 | Dickey et al. |
| 2018/0157330 | A1 | 6/2018 | Gu et al. |
| 2018/0160943 | A1 | 6/2018 | Fyfe et al. |
| 2018/0177464 | A1 | 6/2018 | DeBusschere et al. |
| 2018/0196527 | A1 | 7/2018 | Poupyrev et al. |
| 2018/0256106 | A1 | 9/2018 | Rogers et al. |
| 2018/0296163 | A1 | 10/2018 | DeBusschere et al. |
| 2018/0321841 | A1 | 11/2018 | Lapp |
| 2019/0033981 | A1 | 1/2019 | Poupyrev |
| 2019/0138109 | A1 | 5/2019 | Poupyrev et al. |
| 2019/0155396 | A1 | 5/2019 | Lien et al. |
| 2019/0208837 | A1 | 7/2019 | Poupyrev et al. |
| 2019/0243464 | A1 | 8/2019 | Lien et al. |
| 2019/0257939 | A1 | 8/2019 | Schwesig et al. |
| 2019/0278379 | A1 | 9/2019 | Gribetz et al. |
| 2019/0321719 | A1 | 10/2019 | Gillian et al. |
| 2019/0391667 | A1 | 12/2019 | Poupyrev |
| 2019/0394884 | A1 | 12/2019 | Karagozler et al. |
| 2020/0064924 | A1 | 2/2020 | Poupyrev et al. |
| 2020/0089314 | A1 | 3/2020 | Poupyrev et al. |
| 2020/0150776 | A1 | 5/2020 | Poupyrev et al. |
| 2020/0218361 | A1 | 7/2020 | Poupyrev |
| 2020/0229515 | A1 | 7/2020 | Poupyrev et al. |
| 2020/0278422 | A1 | 9/2020 | Lien et al. |
| 2020/0393912 | A1 | 12/2020 | Lien et al. |

FOREIGN PATENT DOCUMENTS

| | | |
|---|---|---|
| CN | 101349943 | 1/2009 |
| CN | 101636711 | 1/2010 |
| CN | 101751126 | 6/2010 |
| CN | 102414641 | 4/2012 |
| CN | 102782612 | 11/2012 |
| CN | 102893327 | 1/2013 |
| CN | 202887794 | 4/2013 |
| CN | 103076911 | 5/2013 |
| CN | 103091667 | 5/2013 |
| CN | 103502911 | 1/2014 |
| CN | 103534664 | 1/2014 |
| CN | 102660988 | 3/2014 |
| CN | 103675868 | 3/2014 |
| CN | 104035552 | 9/2014 |
| CN | 104115118 | 10/2014 |
| CN | 103355860 | 1/2016 |
| CN | 106154270 | 11/2016 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |
| EP | 2417908 | 2/2012 |
| EP | 2637081 | 9/2013 |
| EP | 2770408 | 8/2014 |
| EP | 2014165476 | 10/2014 |
| EP | 2953007 | 12/2015 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | H11168268 | 6/1999 |
| JP | 2003500759 | 1/2003 |
| JP | 2003280049 | 10/2003 |
| JP | 2006163886 | 6/2006 |
| JP | 2006234716 | 9/2006 |
| JP | 2007011873 | 1/2007 |
| JP | 2007132768 | 5/2007 |
| JP | 2007333385 | 12/2007 |
| JP | 2008287714 | 11/2008 |
| JP | 2009037434 | 2/2009 |
| JP | 2010049583 | 3/2010 |
| JP | 2011003202 | 1/2011 |
| JP | 2011086114 | 4/2011 |
| JP | 2011102457 | 5/2011 |
| JP | 201218583 | 9/2012 |
| JP | 2012198916 | 10/2012 |
| JP | 2013037674 | 2/2013 |
| JP | 2013196047 | 9/2013 |
| JP | 2014503873 | 2/2014 |
| JP | 2014532332 | 12/2014 |
| JP | 2015507263 | 3/2015 |
| JP | 2015509634 | 3/2015 |
| KR | 1020080102516 | 11/2008 |
| KR | 100987650 | 10/2010 |
| KR | 1020130137005 | 12/2013 |
| KR | 1020140055985 | 5/2014 |
| KR | 101914850 | 10/2018 |
| TW | 201425974 | 7/2014 |
| WO | 9001895 | 3/1990 |
| WO | 0130123 | 4/2001 |
| WO | 2001027855 | 4/2001 |
| WO | 0175778 | 10/2001 |
| WO | 2002082999 | 10/2002 |
| WO | 2004004557 | 1/2004 |
| WO | 2004053601 | 6/2004 |
| WO | 2005033387 | 4/2005 |
| WO | 2007125298 | 11/2007 |
| WO | 2008061385 | 5/2008 |
| WO | 2009032073 | 3/2009 |
| WO | 2009083467 | 7/2009 |
| WO | 2010032173 | 3/2010 |
| WO | 2010101697 | 9/2010 |
| WO | 2012026013 | 3/2012 |
| WO | 2012064847 | 5/2012 |
| WO | 2012152476 | 11/2012 |
| WO | 2013082806 | 6/2013 |
| WO | 2013084108 | 6/2013 |
| WO | 2013186696 | 12/2013 |
| WO | 2013191657 | 12/2013 |
| WO | 2013192166 | 12/2013 |
| WO | 2014019085 | 2/2014 |
| WO | 2014085369 | 6/2014 |
| WO | 2014116968 | 7/2014 |
| WO | 2014124520 | 8/2014 |
| WO | 2014136027 | 9/2014 |
| WO | 2014138280 | 9/2014 |
| WO | 2014160893 | 10/2014 |
| WO | 2014165476 | 10/2014 |
| WO | 2014204323 | 12/2014 |
| WO | 2015017931 | 2/2015 |
| WO | 2015022671 | 2/2015 |
| WO | 2015149049 | 10/2015 |
| WO | 2016053624 | 4/2016 |
| WO | 2016118534 | 7/2016 |
| WO | 2016154560 | 9/2016 |
| WO | 2016154568 | 9/2016 |
| WO | 2016176471 | 11/2016 |
| WO | 2016176600 | 11/2016 |
| WO | 2016176606 | 11/2016 |
| WO | 2016178797 | 11/2016 |
| WO | 2017019299 | 2/2017 |
| WO | 2017062566 | 4/2017 |
| WO | 2017079484 | 5/2017 |
| WO | 2017200570 | 11/2017 |

(56) References Cited

FOREIGN PATENT DOCUMENTS

| WO | 2017200571 | 11/2017 |
|---|---|---|
| WO | 20170200949 | 11/2017 |
| WO | 2018106306 | 6/2018 |

OTHER PUBLICATIONS

"Apple Watch Used Four Sensors to Detect your Pulse", retrieved from http://www.theverge.com/2014/9/9/6126991 / apple-watch-four-back-sensors-detect-activity on Sep. 23, 2017 as cited in PCT search report for PCT Application No. PCT/US2016/026756 dated Nov. 10, 2017; The Verge, paragraph 1, Sep. 9, 2014, 4 pages.
"Cardiio", Retrieved From: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, Feb. 24, 2015, 6 pages.
"Clever Toilet Checks on Your Health", CNN.Com; Technology, Jun. 28, 2005, 2 pages.
"Combined Search and Examination Report", GB Application No. 1620892.8, dated Apr. 6, 2017, 5 pages.
"Combined Search and Examination Report", GB Application No. 1620891.0, dated May 31, 2017, 9 pages.
"Corrected Notice of Allowance", U.S. Appl. No. 15/362,359, dated Sep. 17, 2018, 10 pages.
"Corrected Notice of Allowance", U.S. Appl. No. 14/582,896, dated Dec. 19, 2016, 2 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Feb. 23, 2017, 2 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Corrected Notice of Allowance", U.S. Appl. No. 14/312,486, dated Oct. 28, 2016, 4 pages.
"Corrected Notice of Allowance", U.S. Appl. No. 14/312,486, dated Jan. 23, 2017, 4 pages.
"Extended European Search Report", EP Application No. 15170577.9, dated Nov. 5, 2015, 12 pages.
"Final Office Action", U.S. Appl. No. 14/504,061, dated Mar. 9, 2016, 10 pages.
"Final Office Action", U.S. Appl. No. 14/681,625, dated Dec. 7, 2016, 10 pages.
"Final Office Action", U.S. Appl. No. 15/287,253, dated Apr. 2, 2019, 10 pages.
"Final Office Action", U.S. Appl. No. 15/398,147, dated Jun. 30, 2017, 11 pages.
"Final Office Action", U.S. Appl. No. 14/959,799, dated Jul. 19, 2017, 12 pages.
"Final Office Action", U.S. Appl. No. 14/731,195, dated Oct. 11, 2018, 12 pages.
"Final Office Action", U.S. Appl. No. 15/595,649, dated May 23, 2018, 13 pages.
"Final Office Action", U.S. Appl. No. 14/715,454, dated Sep. 7, 2017, 14 pages.
"Final Office Action", U.S. Appl. No. 14/504,139, dated May 1, 2018, 14 pages.
"Final Office Action", U.S. Appl. No. 15/286,512, dated Dec. 26, 2018, 15 pages.
"Final Office Action", U.S. Appl. No. 15/142,619, dated Feb. 8, 2018, 15 pages.
"Final Office Action", U.S. Appl. No. 14/504,121, dated Aug. 8, 2017, 16 pages.
"Final Office Action", U.S. Appl. No. 14/959,730, dated Nov. 22, 2017, 16 pages.
"Final Office Action", U.S. Appl. No. 15/142,689, dated Jun. 1, 2018, 16 pages.
"Final Office Action", U.S. Appl. No. 14/959,799, dated Jan. 4, 2018, 17 pages.
"Final Office Action", U.S. Appl. No. 14/720,632, dated Jan. 9, 2018, 18 pages.
"Final Office Action", U.S. Appl. No. 14/518,863, dated May 5, 2017, 18 pages.
"Final Office Action", U.S. Appl. No. 14/959,901, dated Aug. 25, 2017, 19 pages.
"Final Office Action", U.S. Appl. No. 15/093,533, dated Mar. 21, 2018, 19 pages.
"Final Office Action", U.S. Appl. No. 14/715,454, dated Apr. 17, 2018, 19 pages.
"Final Office Action", U.S. Appl. No. 14/518,863, dated Apr. 5, 2018, 21 pages.
"Final Office Action", U.S. Appl. No. 14/959,901, dated Jun. 15, 2018, 21 pages.
"Final Office Action", U.S. Appl. No. 15/287,308, dated Feb. 8, 2019, 23 pages.
"Final Office Action", U.S. Appl. No. 14/599,954, dated Aug. 10, 2016, 23 pages.
"Final Office Action", U.S. Appl. No. 14/504,038, dated Sep. 27, 2016, 23 pages.
"Final Office Action", U.S. Appl. No. 14/504,121, dated Jul. 9, 2018, 23 pages.
"Final Office Action", U.S. Appl. No. 15/286,152, dated Jun. 26, 2018, 25 pages.
"Final Office Action", U.S. Appl. No. 15/403,066, dated Oct. 5, 2017, 31 pages.
"Final Office Action", U.S. Appl. No. 15/267,181, dated Jun. 7, 2018, 31 pages.
"Final Office Action", U.S. Appl. No. 14/312,486, dated Jun. 3, 2016, 32 pages.
"Final Office Action", U.S. Appl. No. 15/166,198, dated Sep. 27, 2018, 33 pages.
"Final Office Action", U.S. Appl. No. 14/699,181, dated May 4, 2018, 41 pages.
"Final Office Action", U.S. Appl. No. 14/715,793, dated Sep. 12, 2017, 7 pages.
"Final Office Action", U.S. Appl. No. 14/809,901, dated Dec. 13, 2018, 7 pages.
"Final Office Action", Korean Application No. 10-2016-7036023, dated Feb. 19, 2018, 8 pages.
"Final Office Action", U.S. Appl. No. 14/874,955, dated Jun. 30, 2017, 9 pages.
"Final Office Action", U.S. Appl. No. 14/874,955, dated Jun. 11, 2018, 9 pages.
"First Action Interview OA", U.S. Appl. No. 14/715,793, dated Jun. 21, 2017, 3 pages.
"First Action Interview Office Action", U.S. Appl. No. 15/142,471, dated Feb. 5, 2019, 29 pages.
"First Action Interview Office Action", U.S. Appl. No. 14/959,901, dated Apr. 14, 2017, 3 pages.
"First Action Interview Office Action", U.S. Appl. No. 14/731,195, dated Jun. 21, 2018, 4 pages.
"First Action Interview Office Action", U.S. Appl. No. 15/286,152, dated Mar. 1, 2018, 5 pages.
"First Action Interview Office Action", U.S. Appl. No. 15/166,198, dated Apr. 25, 2018, 8 pages.
"First Action Interview Pilot Program Pre-Interview Communication", U.S. Appl. No. 14/731,195, dated Aug. 1, 2017, 3 pages.
"First Exam Report", EP Application No. 15754352.1, dated Mar. 5, 2018, 7 pages.
"First Examination Report", GB Application No. 1621332.4, dated May 16, 2017, 7 pages.
"Foreign Office Action", Chinese Application No. 201580034536.8, dated Oct. 9, 2018.
"Foreign Office Action", Korean Application No. 1020187029464, dated Oct. 30, 2018, 1 page.
"Foreign Office Action", KR Application No. 10-2016-7036023, dated Aug. 11, 2017, 10 pages.

(56) References Cited

OTHER PUBLICATIONS

"Foreign Office Action", Chinese Application No. 201580034908.7, dated Feb. 19, 2019, 10 pages.
"Foreign Office Action", Japanese Application No. 2018-501256, dated Jul. 24, 2018, 11 pages.
"Foreign Office Action", Chinese Application No. 201580036075.8, dated Jul. 4, 2018, 14 page.
"Foreign Office Action", European Application No. 16725269.1, dated Nov. 26, 2018, 14 pages.
"Foreign Office Action", JP Application No. 2016-563979, dated Sep. 21, 2017, 15 pages.
"Foreign Office Action", Japanese Application No. 1020187027694, dated Nov. 23, 2018, 15 pages.
"Foreign Office Action", CN Application No. 201580034908.7, dated Jul. 3, 2018, 17 pages.
"Foreign Office Action", Chinese Application No. 201510300495.4, dated Jun. 21, 2018, 18 pages.
"Foreign Office Action", Chinese Application No. 201721290290.3, dated Mar. 9, 2018, 2 pages.
"Foreign Office Action", Chinese Application No. 201580035246.5, dated Jan. 31, 2019, 22 pages.
"Foreign Office Action", JP App. No. 2016-567813, dated Jan. 16, 2018, 3 pages.
"Foreign Office Action", Korean Application No. 10-2016-7036015, dated Oct. 15, 2018, 3 pages.
"Foreign Office Action", Japanese Application No. 2018501256, dated Feb. 26, 2019, 3 pages.
"Foreign Office Action", Japanese Application No. 2016-567839, dated Apr. 3, 2018, 3 pages.
"Foreign Office Action", European Application No. 16784352.3, dated May 16, 2018, 3 pages.
"Foreign Office Action", Japanese Application No. 2016-563979, dated May 21, 2018, 3 pages.
"Foreign Office Action", Chinese Application No. 201721290290.3, dated Jun. 6, 2018, 3 pages.
"Foreign Office Action", European Application No. 15170577.9, dated Dec. 21, 2018, 31 pages.
"Foreign Office Action", Japanese Application No. 2016-575564, dated Jan. 10, 2019, 4 pages.
"Foreign Office Action", Korean Application No. 10-2016-7036023, dated Apr. 12, 2018, 4 pages.
"Foreign Office Action", Japanese Application No. 2016-575564, dated Jul. 10, 2018, 4 pages.
"Foreign Office Action", KR Application No. 10-2016-7035397, dated Sep. 20, 2017, 5 pages.
"Foreign Office Action", Korean Application No. 10-2017-7027877, dated Nov. 23, 2018, 5 pages.
"Foreign Office Action", Japanese Application No. 2017-541972, dated Nov. 27, 2018, 5 pages.
"Foreign Office Action", European Application No. 15754352.1, dated Nov. 7, 2018, 5 pages.
"Foreign Office Action", Japanese Application No. 2016-575564, dated Dec. 5, 2017, 5 pages.
"Foreign Office Action", UK Application No. 1620891.0, dated Dec. 6, 2018, 5 pages.
"Foreign Office Action", Chinese Application No. 201580036075.8, dated Feb. 19, 2019, 5 pages.
"Foreign Office Action", Japanese Application No. 2016-563979, dated Feb. 7, 2018, 5 pages.
"Foreign Office Action", Korean Application No. 10-2017-7027871, dated Nov. 23, 2018, 6 pages.
"Foreign Office Action", Korean Application No. 1020187012629, dated May 24, 2018, 6 pages.
"Foreign Office Action", EP Application No. 15170577.9, dated May 30, 2017, 7 pages.
"Foreign Office Action", Korean Application No. 10-2016-7036396, dated Jan. 3, 2018, 7 pages.
"Foreign Office Action", JP Application No. 2016567813, dated Sep. 22, 2017, 8 pages.
"Foreign Office Action", Japanese Application No. 2018021296, dated Dec. 25, 2018, 8 pages.
"Foreign Office Action", EP Application No. 15754323.2, dated Mar. 9, 2018, 8 pages.
"Foreign Office Action", European Application No. 16724775.8, dated Nov. 23, 2018, 9 pages.
"Foreign Office Action", KR Application No. 10-2016-7032967, English Translation, dated Sep. 14, 2017, 4 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Preliminary Report on Patentability", PCT Application No. PCT/US2016/063874, dated Nov. 29, 2018, 12 pages.
"International Preliminary Report on Patentability", Application No. PCT/US2015/030388, dated Dec. 15, 2016, 12 pages.
"International Preliminary Report on Patentability", Application No. PCT/US2015/043963, dated Feb. 16, 2017, 12 pages.
"International Preliminary Report on Patentability", Application No. PCT/US2015/050903, dated Apr. 13, 2017, 12 pages.
"International Preliminary Report on Patentability", Application No. PCT/US2015/043949, dated Feb. 16, 2017, 13 pages.
"International Preliminary Report on Patentability", PCT Application No. PCT/US2017/032733, dated Nov. 29, 2018, 7 pages.
"International Preliminary Report on Patentability", PCT Application No. PCT/US2016/026756, dated Oct. 19, 2017, 8 pages.
"International Preliminary Report on Patentability", Application No. PCT/US2015/044774, dated Mar. 2, 2017, 8 pages.
"International Search Report and Written Opinion", Application No. PCT/US2016/060399, dated Jan. 30, 2017, 11 pages.
"International Search Report and Written Opinion", PCT Application No. PCT/US2016/065295, dated Mar. 14, 2017, 12 pages.
"International Search Report and Written Opinion", Application No. PCT/US2015/044774, dated Nov. 3, 2015, 12 pages.
"International Search Report and Written Opinion", Application No. PCT/US2016/042013, dated Oct. 26, 2016, 12 pages.
"International Search Report and Written Opinion", Application No. PCT/US2016/062082, dated Feb. 23, 2017, 12 pages.
"International Search Report and Written Opinion", PCT/US2017/047691, dated Nov. 16, 2017, 13 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/034366, dated Nov. 17, 2016, 13 pages.
"International Search Report and Written Opinion", Application No. PCT/US2016/029820, dated Jul. 15, 2016, 14 pages.
"International Search Report and Written Opinion", Application No. PCT/US2016/055671, dated Dec. 1, 2016, 14 pages.
"International Search Report and Written Opinion", Application No. PCT/US2016/030177, dated Aug. 2, 2016, 15 pages.
"International Search Report and Written Opinion", PCT Application No. PCT/US2017/051663, dated Nov. 29, 2017, 16 pages.
"International Search Report and Written Opinion", Application No. PCT/US2015/043963, dated Nov. 24, 2015, 16 pages.
"International Search Report and Written Opinion", Application No. PCT/US2016/024289, dated Aug. 25, 2016, 17 pages.
"International Search Report and Written Opinion", Application No. PCT/US2015/043949, dated Dec. 1, 2015, 18 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2016/063874, dated May 11, 2017, 19 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.rnicrosoft.com/en-us/projects/lifex >, Feb. 3, 2017, 2 pages.

(56) References Cited

OTHER PUBLICATIONS

"Non-Final Office Action", U.S. Appl. No. 15/596,702, dated Jan. 4, 2019, 10 pages.
"Non-Final Office Action", U.S. Appl. No. 15/286,837, dated Oct. 25, 2018, 10 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Non-Final Office Action", U.S. Appl. No. 15/398,147, dated Mar. 9, 2017, 10 pages.
"Non-Final Office Action", U.S. Appl. No. 14/504,139, dated Oct. 18, 2017, 12 pages.
"Non-Final Office Action", U.S. Appl. No. 15/287,155, dated Dec. 10, 2018, 12 pages.
"Non-Final Office Action", U.S. Appl. No. 14/666,155, dated Feb. 3, 2017, 12 pages.
"Non-Final Office Action", U.S. Appl. No. 14/504,121, dated Jan. 9, 2017, 13 pages.
"Non-Final Office Action", U.S. Appl. No. 14/809,901, dated May 24, 2018, 13 pages.
"Non-Final Office Action", U.S. Appl. No. 14/959,730, dated Jan. 23, 2017, 14 pages.
"Non-Final Office Action", U.S. Appl. No. 14/862,409, dated Jun. 22, 2017, 15 pages.
"Non-Final Office Action", U.S. Appl. No. 14/930,220, dated Sep. 14, 2016, 15 pages.
"Non-Final Office Action", U.S. Appl. No. 16/238,464, dated Mar. 7, 2019, 15 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Non-Final Office Action", U.S. Appl. No. 14/720,632, dated Jun. 14, 2017, 16 pages.
"Non-Final Office Action", U.S. Appl. No. 15/142,619, dated Aug. 24, 2017, 16 pages.
"Non-Final Office Action", U.S. Appl. No. 14/959,799, dated Sep. 8, 2017, 16 pages.
"Non-Final Office Action", U.S. Appl. No. 14/715,454, dated Jan. 11, 2018, 16 pages.
"Non-Final Office Action", U.S. Appl. No. 15/595,649, dated Oct. 31, 2017, 16 pages.
"Non-Final Office Action", U.S. Appl. No. 14/504,139, dated Oct. 5, 2018, 16 pages.
"Non-Final Office Action", U.S. Appl. No. 14/518,863, dated Oct. 14, 2016, 16 pages.
"Non-Final Office Action", U.S. Appl. No. 14/599,954, dated Jan. 26, 2017, 16 pages.
"Non-Final Office Action", U.S. Appl. No. 14/862,409, dated Dec. 14, 2017, 17 pages.
"Non-Final Office Action", U.S. Appl. No. 14/599,954, dated Feb. 2, 2016, 17 pages.
"Non-Final Office Action", U.S. Appl. No. 15/287,253, dated Apr. 5, 2018, 17 pages.
"Non-Final Office Action", U.S. Appl. No. 15/093,533, dated Aug. 24, 2017, 18 pages.
"Non-Final Office Action", U.S. Appl. No. 15/142,689, dated Oct. 4, 2017, 18 pages.
"Non-Final Office Action", U.S. Appl. No. 15/287,308, dated Oct. 15, 2018, 18 pages.
"Non-Final Office Action", U.S. Appl. No. 15/286,537, dated Nov. 19, 2018, 18 pages.
"Non-Final Office Action", U.S. Appl. No. 14/504,121, dated Jan. 2, 2018, 19 pages.
"Non-Final Office Action", U.S. Appl. No. 15/287,253, dated Sep. 7, 2018, 20 pages.
"Non-Final Office Action", U.S. Appl. No. 14/518,863, dated Sep. 29, 2017, 20 pages.
"Non-Final Office Action", U.S. Appl. No. 14/720,632, dated May 18, 2018, 20 pages.
"Non-Final Office Action", U.S. Appl. No. 14/959,901, dated Jan. 8, 2018, 21 pages.
"Non-Final Office Action", U.S. Appl. No. 14/959,901, dated Oct. 11, 2018, 22 pages.
"Non-Final Office Action", U.S. Appl. No. 14/504,038, dated Feb. 26, 2016, 22 pages.
"Non-Final Office Action", U.S. Appl. No. 14/312,486, dated Oct. 23, 2015, 25 pages.
"Non-Final Office Action", U.S. Appl. No. 15/286,152, dated Oct. 19, 2018, 27 pages.
"Non-Final Office Action", U.S. Appl. No. 15/267,181, dated Feb. 8, 2018, 29 pages.
"Non-Final Office Action", U.S. Appl. No. 15/403,066, dated May 4, 2017, 31 pages.
"Non-Final Office Action", U.S. Appl. No. 14/699,181, dated Oct. 18, 2017, 33 pages.
"Non-Final Office Action", U.S. Appl. No. 14/504,038, dated Mar. 22, 2017, 33 pages.
"Non-Final Office Action", U.S. Appl. No. 15/287,394, dated Mar. 22, 2019, 39 pages.
"Non-Final Office Action", U.S. Appl. No. 15/166,198, dated Feb. 21, 2019, 48 pages.
"Non-Final Office Action", U.S. Appl. No. 15/398,147, dated Sep. 8, 2017, 7 pages.
"Non-Final Office Action", U.S. Appl. No. 14/874,955, dated Feb. 8, 2018, 7 pages.
"Non-Final Office Action", U.S. Appl. No. 14/681,625, dated Mar. 6, 2017, 7 pages.
"Non-Final Office Action", U.S. Appl. No. 15/586,174, dated Jun. 18, 2018, 7 pages.
"Non-Final Office Action", U.S. Appl. No. 14/504,061, dated Nov. 4, 2015, 8 pages.
"Non-Final Office Action", U.S. Appl. No. 14/874,955, dated Feb. 27, 2017, 8 pages.
"Non-Final Office Action", U.S. Appl. No. 14/582,896, dated Jun. 29, 2016, 9 pages.
"Non-Final Office Action", U.S. Appl. No. 14/681,625, dated Aug. 12, 2016, 9 pages.
"Non-Final Office Action", U.S. Appl. No. 14/666,155, dated Aug. 24, 2016, 9 pages.
"Non-Final Office Action", U.S. Appl. No. 14/513,875, dated Feb. 21, 2017, 9 pages.
"Non-Invasive Quantification of Peripheral Arterial Volume Distensibilitiy and its Non-Lineaer Relationship with Arterial Pressure", Journal of Biomechanics, Pergamon Press, vol. 42, no. 8; as cited in the search report for PCT/US2016/013968 citing the whole document, but in particular the abstract, May 29, 2009, 2 pages.
"Notice of Allowance", U.S. Appl. No. 14/599,954, dated May 24, 2017, 11 pages.
"Notice of Allowance", U.S. Appl. No. 14/312,486, dated Oct. 7, 2016, 15 pages.
"Notice of Allowance", U.S. Appl. No. 14/504,038, dated Aug. 7, 2017, 17 pages.
"Notice of Allowance", U.S. Appl. No. 15/403,066, dated Jan. 8, 2018, 18 pages.
"Notice of Allowance", U.S. Appl. No. 15/287,200, dated Nov. 6, 2018, 19 pages.
"Notice of Allowance", U.S. Appl. No. 15/286,152, dated Mar. 5, 2019, 23 pages.
"Notice of Allowance", U.S. Appl. No. 14/715,793, dated Jul. 6, 2018, 5 pages.
"Notice of Allowance", U.S. Appl. No. 15/286,495, dated Jan. 17, 2019, 5 pages.
"Notice of Allowance", U.S. Appl. No. 15/595,649, dated Jan. 3, 2019, 5 pages.
"Notice of Allowance", U.S. Appl. No. 14/715,793, dated Dec. 18, 2017, 5 pages.
"Notice of Allowance", U.S. Appl. No. 14/666,155, dated Feb. 20, 2018, 5 pages.
"Notice of Allowance", U.S. Appl. No. 14/582,896, dated Nov. 7, 2016, 5 pages.

(56) References Cited

OTHER PUBLICATIONS

"Notice of Allowance", U.S. Appl. No. 15/586,174, dated Sep. 24, 2018, 5 pages.
"Notice of Allowance", U.S. Appl. No. 14/513,875, dated Jun. 28, 2017, 7 pages.
"Notice of Allowance", U.S. Appl. No. 14/666,155, dated Jul. 10, 2017, 7 pages.
"Notice of Allowance", U.S. Appl. No. 14/874,955, dated Oct. 20, 2017, 7 pages.
"Notice of Allowance", U.S. Appl. No. 14/504,061, dated Sep. 12, 2016, 7 pages.
"Notice of Allowance", U.S. Appl. No. 14/494,863, dated May 30, 2017, 7 pages.
"Notice of Allowance", U.S. Appl. No. 14/681,625, dated Jun. 7, 2017, 7 pages.
"Notice of Allowance", U.S. Appl. No. 15/286,837, dated Mar. 6, 2019, 7 pages.
"Notice of Allowance", U.S. Appl. No. 14/862,409, dated Jun. 6, 2018, 7 pages.
"Notice of Allowance", U.S. Appl. No. 15/362,359, dated Aug. 3, 2018, 8 pages.
"Notice of Allowance", U.S. Appl. No. 14/681,625, dated Oct. 23, 2017, 8 pages.
"Notice of Allowance", U.S. Appl. No. 14/874,955, dated Oct. 4, 2018, 8 pages.
"Notice of Allowance", U.S. Appl. No. 15/398,147, dated Nov. 15, 2017, 8 pages.
"Notice of Allowance", U.S. Appl. No. 14/959,730, dated Feb. 22, 2018, 8 pages.
"Notice of Allowance", U.S. Appl. No. 15/142,829, dated Feb. 6, 2019, 8 pages.
"Notice of Allowance", U.S. Appl. No. 14/930,220, dated Feb. 2, 2017, 8 pages.
"Notice of Allowance", U.S. Appl. No. 15/595,649, dated Sep. 14, 2018, 8 pages.
"Notice of Allowance", U.S. Appl. No. 15/343,067, dated Jul. 27, 2017, 9 pages.
"Notice of Allowance", U.S. Appl. No. 15/142,689, dated Oct. 30, 2018, 9 pages.
"Notice of Allowance", U.S. Appl. No. 14/504,137, dated Feb. 6, 2019, 9 pages.
"Notice of Allowance", U.S. Appl. No. 15/142,619, dated Aug. 13, 2018, 9 pages.
"Philips Vital Signs Camera", Retrieved From: <http://www.vitalsignscamera.com/> Apr. 15, 2015, Jul. 17, 2013, 2 pages.
"Pre-Interview Communication", U.S. Appl. No. 15/287,359, dated Jul. 24, 2018, 2 pages.
"Pre-Interview Communication", U.S. Appl. No. 15/142,471, dated Dec. 12, 2018, 3 pages.
"Pre-Interview Communication", U.S. Appl. No. 14/513,875, dated Oct. 21, 2016, 3 pages.
"Pre-Interview Communication", U.S. Appl. No. 14/959,901, dated Feb. 10, 2017, 3 pages.
"Pre-Interview Communication", U.S. Appl. No. 14/959,730, dated Feb. 15, 2017, 3 pages.
"Pre-Interview Communication", U.S. Appl. No. 14/715,793, dated Mar. 20, 2017, 3 pages.
"Pre-Interview Communication", U.S. Appl. No. 14/715,454, dated Apr. 14, 2017, 3 pages.
"Pre-Interview Communication", U.S. Appl. No. 15/343,067, dated Apr. 19, 2017, 3 pages.
"Pre-Interview Communication", U.S. Appl. No. 15/286,495, dated Sep. 10, 2018, 4 pages.
"Pre-Interview Communication", U.S. Appl. No. 15/362,359, dated May 17, 2018, 4 pages.
"Pre-Interview Communication", U.S. Appl. No. 15/703,511, dated Feb. 11, 2019, 5 pages.
"Pre-Interview Communication", U.S. Appl. No. 14/494,863, dated Jan. 27, 2017, 5 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Pre-Interview Office Action", U.S. Appl. No. 14/862,409, dated Sep. 15, 2017, 16 pages.
"Pre-Interview Office Action", U.S. Appl. No. 14/731,195, dated Dec. 20, 2017, 4 pages.
"Preliminary Report on Patentability", PCT Application No. PCT/US2016/034366, dated Dec. 7, 2017, 10 pages.
"Preliminary Report on Patentability", PCT Application No. PCT/US2016/030177, dated Oct. 31, 2017, 11 pages.
"Preliminary Report on Patentability", PCT Application No. PCT/US2016/030115, dated Oct. 31, 2017, 15 pages.
"Preliminary Report on Patentability", PCT Application No. PCT/US2016/030185, dated Nov. 9, 2017, 16 pages.
"Preliminary Report on Patentability", PCT Application No. PCT/US2016/065295, dated Jul. 24, 2018, 18 pages.
"Preliminary Report on Patentability", PCT Application No. PCT/US2016/042013, dated Jan. 30, 2018, 7 pages.
"Preliminary Report on Patentability", PCT Application No. PCT/US2016/062082, dated Nov. 15, 2018, 8 pages.
"Preliminary Report on Patentability", PCT Application No. PCT/US2016/055671, dated Apr. 10, 2018, 9 pages.
"Preliminary Report on Patentability", PCT Application No. PCT/US2016/032307, dated Dec. 7, 2017, 9 pages.
"Pressure-Volume Loop Analysis in Cardiology", retrieved from https://en.wikipedia.org/w/index.php?title=Pressure-volume loop analysis in card iology&oldid=636928657 on Sep. 23, 2017; Obtained per link provided in search report from PCT/US2016/01398 dated Jul. 28, 2016, dated Dec. 6, 2014, 10 pages.
"Restriction Requirement", U.S. Appl. No. 15/362,359, dated Jan. 8, 2018, 5 pages.
"Restriction Requirement", U.S. Appl. No. 14/666,155, dated Jul. 22, 2016, 5 pages.
"Restriction Requirement", U.S. Appl. No. 15/462,957, dated Jan. 4, 2019, 6 pages.
"Restriction Requirement", U.S. Appl. No. 15/352,194, dated Feb. 6, 2019, 8 pages.
"Restriction Requirement", U.S. Appl. No. 15/286,537, dated Aug. 27, 2018, 8 pages.
"Textile Wire Brochure", Retrieved at: http://www.textile-wire.ch/en/home.html, Aug. 7, 2004, 17 pages.
"The Dash smart earbuds play back music, and monitor your workout", Retrieved from < http://newatlas.com/bragi-dash-tracking-earbuds/30808/>, Feb. 13, 2014, 3 pages.
"The Instant Blood Pressure app estimates blood pressure with your smartphone and our algorithm", Retrieved at: http://www.instantbloodpressure.com/—on Jun. 23, 2016, 6 pages.
"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.htnnl, Dec. 24, 2018, 4 pages.
"Written Opinion", PCT Application No. PCT/US2016/030185, dated Nov. 3, 2016, 15 pages.
"Written Opinion", PCT Application No. PCT/US2017/032733, dated Jul. 24, 2017, 5 pages.
"Written Opinion", PCT Application No. PCT/US2017/032733, dated Jul. 26, 2017, 5 pages.
"Written Opinion", PCT Application No. PCT/US2016/042013, dated Feb. 2, 2017, 6 pages.
"Written Opinion", PCT Application No. PCT/US2016/060399, dated May 11, 2017, 6 pages.
"Written Opinion", PCT Application No. PCT/US2016/026756, dated Nov. 10, 2016, 7 pages.
"Written Opinion", PCT Application No. PCT/US2016/055671, dated Apr. 13, 2017, 8 pages.
"Written Opinion", PCT Application No. PCT/US2017/051663, dated Oct. 12, 2018, 8 pages.
"Written Opinion", PCT Application No. PCT/US2016/065295, dated Apr. 13, 2018, 8 pages.
"Written Opinion", PCT Application PCT/US2016/013968, dated Jul. 28, 2016, 9 pages.

(56) References Cited

OTHER PUBLICATIONS

"Written Opinion", PCT Application No. PCT/US2016/030177, dated Nov. 3, 2016, 9 pages.

Antonimuthu, "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.

Arbabian, Amin et al., "A 94GHz mm-Wave to Baseband Pulsed-Radar for Imaging and Gesture Recognition", 2012 IEEE, 2012 Symposium on VLSI Circuits Digest of Technical Papers, Jan. 1, 2012, 2 pages.

Balakrishnan, Guha et al., "Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.

Bondade, Rajdeep et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.

Cheng, Jingyuan "Smart Textiles: From Niche to Mainstream", IEEE Pervasive Computing, pp. 81-84.

Couderc, Jean-Philippe et al., "Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, 7 pages.

Dias, T et al., "Capacitive Fibre-Meshed Transducer for Touch & Proximity Sensing Applications", IEEE Sensors Journal, IEEE Service Center, New York, NY, US, vol. 5, No. 5, Oct. 1, 2005 (Oct. 1, 2005), pp. 989-994, XP011138559, ISSN: 1530-437X, DOI: 10.1109/JSEN.2005.844327, Oct. 1, 2005, 5 pages.

Duncan, David P. "Motion Compensation of Synthetic Aperture Radar", Microwave Earth Remote Sensing Laboratory, Brigham Young University, Apr. 15, 2003, 5 pages.

Espina, Javier et al., "Wireless Body Sensor Network for Continuous Cuff-less Blood Pressure Monitoring", International Summer School on Medical Devices and Biosensors, 2006, 5 pages.

Fan, Tenglong et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.

Farringdon, Jonny et al., "Wearable Sensor Badge & Sensor Jacket for Context Awareness", Third International Symposium on Wearable Computers, 7 pages.

Garmatyuk, Dmitriy S. et al., "Ultra-Wideband Continuous-Wave Random Noise Arc-SAR", IEEE Transaction on Geoscience and Remote Sensing, vol. 40, No. 12, Dec. 2002, Dec. 2002, 10 pages.

Geisheimer, Jonathan L. et al., "A Continuous-Wave (CW) Radar for Gait Analysis", IEEE 2001, 2001, 5 pages.

Godana, Bruhtesfa E. "Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.

Gürbüz, Sevgi Z. et al., "Detection and Identification of Human Targets in Radar Data", Proc. SPIE 6567, Signal Processing, Sensor Fusion, and Target Recognition XVI, 656701, May 7, 2007, 12 pages.

He, David D. "A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, 137 pages.

Holleis, Paul et al., "Evaluating Capacitive Touch Input on Clothes", Proceedings of the 10th International Conference on Human Computer Interaction, Jan. 1, 2008, 10 pages.

Holleis, Paul et al., "Evaluating Capacitive Touch Input on Clothes", Proceedings of the 10th International Conference on Human Computer Interaction With Mobile Devices and Services, Jan. 1, 2008 (Jan. 1, 2008), p. 81, XP055223937, New York, NY, US DOI: 10.1145/1409240.1409250 ISBN: 978-1-59593-952-4, Jan. 1, 2008, 11 pages.

Ishijima, Masa "Unobtrusive Approaches to Monitoring Vital Signs at Home", Medical & Biological Engineering and Computing, Springer, Berlin, DE, vol. 45, No. 11 as cited in search report for PCT/US2016/013968 dated Jul. 28, 2016, dated Sep. 26, 2007, 3 pages.

Klabunde, Richard E. "Ventricular Pressure-vol. Loop Changes in Valve Disease", Retrieved From <hitps://web.archive.org/web/20101201185256/http://cvphysiology.com/Heart%20Disease/HD009.htm>, Dec. 1, 2010, 8 pages.

Kubota, Yusuke et al., "A Gesture Recognition Approach by using Microwave Doppler Sensors", IPSJ SIG Technical Report, 2009 (6), Information Processing Society of Japan, Apr. 15, 2010, pp. 1-8, Apr. 15, 2010, 13 pages.

Lee, Cullen E. "Computing the Apparent Centroid of Radar Targets", Sandia National Laboratories; Presented at the Proceedings of the 1996 IEEE National Radar Conference: Held at the University of Michigan; May 13-16, 1996; retrieved from https://www.osti.gov/scitech/servlets/purl/218705 on Sep. 24, 2017, 21 pages.

Lien, Jaime et al., "Soli: Ubiquitous Gesture Sensing with Millimeter Wave Radar", ACM Transactions on Graphics (TOG), ACM, Us, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.

Martinez-Garcia, Hermino et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016)pp. 151-160, XP035898949, ISSN: 0925-1030, DOI: 10.1007/S10470-016-0747-8, Apr. 23, 2016, 10 pages.

Matthews, Robert J. "Venous Pulse", Retrieved at: http://www.rjmatthewsmd.com/Definitions/venous_pulse.htm—on Nov. 30, 2016, Apr. 13, 2013, 7 pages.

Nakajima, Kazuki et al., "Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, 8 pages.

Narasimhan, Shar "Combining Self- & Mutual-Capacitive Sensing for Distinct User Advantages", Retrieved from the Internet: URL:http://www.designnews.com/author.asp?section_id=1365&doc_id=271356&print=yes [retrieved on Oct. 1, 2015], Jan. 31, 2014, 5 pages.

Otto, Chris et al., "System Architecture of a Wireless Body Area Sensor Network for Ubiquitous Health Monitoring", Journal of Mobile Multimedia; vol. 1, No. 4, Jan. 10, 2006, 20 pages.

Palese, et al., "The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, Jan. 1, 2013, pp. 8-12.

Patel, P C. et al., "Applications of Electrically Conductive Yarns in Technical Textiles", International Conference on Power System Technology (POWECON), Oct. 30, 2012, 6 pages.

Poh, Ming-Zher et al., "A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, Jan. 1, 2011, 1 page.

Poh, Ming-Zher et al., "Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, May 7, 2010, 13 pages.

Pu, Qifan et al., "Gesture Recognition Using Wireless Signals", pp. 15-18.

(56) References Cited

OTHER PUBLICATIONS

Pu, Qifan et al., "Whole-Home Gesture Recognition Using Wireless Signals", MobiCom'13, Sep. 30-Oct. 4, Miami, FL, USA, 2013, 12 pages.
Pu, Qifan et al., "Whole-Home Gesture Recognition Using Wireless Signals", Proceedings of the 19th annual international conference on Mobile computing & networking (MobiCom'13), US, ACM, Sep. 30, 2013, pp. 27-38, Sep. 30, 2013, 12 pages.
Pu, Quifan et al., "Whole-Home Gesture Recognition Using Wireless Signals", MobiCom '13 Proceedings of the 19th annual international conference on Mobile computing & networking, Aug. 27, 2013, 12 pages.
Schneegass, Stefan et al., "Towards a Garment OS: Supporting Application Development for Smart Garments", Wearable Computers, Acm, Sep. 13, 2014, 6 pages.
Skolnik, Merrill I. "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.
Stoppa, Matteo "Wearable Electronics and Smart Textiles: A Critical Review", In Proceedings of Sensors, vol. 14, Issue 7, Jul. 7, 2014, pp. 11957-11992.
Wang, Wenjin et al., "Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang, Yazhou et al., "Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana, R et al., "Capacitive Fibre-Meshed Transducer for Touch & Proximity Sensing Applications", IEEE Sensors Journal, IEEE Service Center, Oct. 1, 2005, 5 pages.
Zhadobov, Maxim et al., "Millimeter-Wave Interactions with the Human Body: State of Knowledge and Recent Advances", International Journal of Microwave and Wireless Technologies, p. 1 of 11. # Cambridge University Press and the European Microwave Association, 2011 doi:10.1017/S1759078711000122, 2011.
Zhadobov, Maxim et al., "Millimeter-wave Interactions with the Human Body: State of Knowledge and Recent Advances", International Journal of Microwave and Wireless Technologies, Mar. 1, 2011, 11 pages.
Zhang, Ruquan et al., "Study of the Structural Design and Capacitance Characteristics of Fabric Sensor", Advanced Materials Research (vols. 194-196), Feb. 21, 2011, 8 pages.
Zheng, Chuan et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.
"Final Office Action", U.S. Appl. No. 15/287,155, dated Apr. 10, 2019, 11 pages.
"Final Office Action", U.S. Appl. No. 15/286,537, dated Apr. 19, 2019, 21 pages.
"Final Office Action", U.S. Appl. No. 14/959,901, dated May 30, 2019, 18 pages.
"Final Office Action", U.S. Appl. No. 15/142,471, dated Jun. 20, 2019, 26 pages.
"First Action Interview Office Action", U.S. Appl. No. 15/917,238, dated Jun. 6, 2019, 6 pages.
"International Preliminary Report on Patentability", PCT Application No. PCT/US2017/051663, dated Jun. 20, 2019, 10 pages.
"Non-Final Office Action", U.S. Appl. No. 15/424,263, dated May 23, 2019, 12 pages.
"Non-Final Office Action", U.S. Appl. No. 15/462,957, dated May 24, 2019, 14 pages.
"Notice of Allowance", U.S. Appl. No. 15/703,511, dated Apr. 16, 2019, 5 pages.
"Notice of Allowance", U.S. Appl. No. 15/352,194, dated Jun. 26, 2019, 8 pages.
"Pre-Interview Communication", U.S. Appl. No. 15/917,238, dated May 1, 2019, 6 pages.
"Final Office Action", U.S. Appl. No. 15/287,359, dated Feb. 19, 2020, 16 Pages.
"Foreign Office Action", Korean Application No. 1020187004283, dated Jan. 3, 2020, 8 pages.
"Non-Final Office Action", U.S. Appl. No. 16/252,477, dated Jan. 10, 2020, 13 Pages.
"Notice of Allowance", U.S. Appl. No. 15/462,957, dated Jan. 23, 2020, 8 Pages.
"Notice of Allowance", U.S. Appl. No. 16/356,748, dated Feb. 11, 2020, 5 Pages.
"Notice of Allowance", U.S. Appl. No. 15/791,044, dated Feb. 12, 2020, 8 Pages.
"Notice of Allowance", U.S. Appl. No. 16/153,395, dated Feb. 20, 2020, 13 Pages.
"Final Office Action", U.S. Appl. No. 15/287,394, dated Sep. 30, 2019, 38 Pages.
"Final Office Action", U.S. Appl. No. 16/238,464, dated Jul. 25, 2019, 15 pages.
"Non-Final Office Action", U.S. Appl. No. 15/286,537, dated Sep. 3, 2019, 28 Pages.
"Non-Final Office Action", U.S. Appl. No. 15/791,044, dated Sep. 30, 2019, 22 Pages.
"Notice of Allowance", U.S. Appl. No. 15/287,308, dated Jul. 17, 2019, 17 Pages.
"Notice of Allowance", U.S. Appl. No. 15/917,238, dated Aug. 21, 2019, 13 pages.
"Notice of Allowance", U.S. Appl. No. 16/389,402, dated Aug. 21, 2019, 7 Pages.
"Notice of Allowance", U.S. Appl. No. 15/287,253, dated Aug. 26, 2019, 13 Pages.
"Notice of Allowance", U.S. Appl. No. 15/287,155, dated Jul. 25, 2019, 7 pages.
"Notice of Allowance", U.S. Appl. No. 15/287,394, dated Mar. 4, 2020, 11 Pages.
"Pre-Interview Communication", U.S. Appl. No. 16/401,611, dated Apr. 13, 2020, 4 Pages.
"EP Appeal Decision", European Application No. 10194359.5, May 28, 2019, 20 pages.
"Final Office Action", U.S. Appl. No. 15/462,957, dated Nov. 8, 2019, 10 Pages.
"Foreign Office Action", Korean Application No. 1020197004803, dated Oct. 13, 2019, 2 pages.
"Foreign Office Action", Japanese Application No. 2018501256, dated Oct. 23, 2019, 5 pages.
"Foreign Office Action", British Application No. 1621332.4, dated Nov. 6, 2019, 3 pages.
"Foreign Office Action", Japanese Application No. 2018156138, dated Sep. 30, 2019, 3 pages.
"Galaxy S4 Air Gesture", Galaxy S4 Guides, https://allaboutgalaxys4.com/galaxy-s4-features-explained/air-gesture/, 4 pages.
"Non-Final Office Action", U.S. Appl. No. 15/596,702, dated Oct. 21, 2019, 21 Pages.
"Non-Final Office Action", U.S. Appl. No. 16/153,395, dated Oct. 22, 2019, 10 Pages.
"Notice of Allowance", U.S. Appl. No. 16/356,748, dated Oct. 17, 2019, 9 Pages.
"Notice of Allowance", U.S. Appl. No. 16/238,464, dated Nov. 4, 2019, 10 Pages.
"Notice of Allowance", U.S. Appl. No. 15/424,263, dated Nov. 14, 2019, 10 Pages.
"Samsung Galaxy S4 Air Gestures", Video from https://www.youtube.com/watch?v=375Hb87yGcg, May 7, 2013.
Amihood, et al., "Closed-Loop Manufacturing System Using Radar", Technical Disclosure Commons; Retrieved from http://www.tdcommons.org/dpubs_series/464, Apr. 17, 2017, 8 pages.
Karagozler, et al., "Embedding Radars in Robots to Accurately Measure Motion", Technical Disclosure Commons; Retrieved from http://www.tdcommons.org/dpubs_series/454, Mar. 30, 2017, 8 pages.

(56) References Cited

OTHER PUBLICATIONS

Lien, et al., "Embedding Radars in Robots for Safety and Obstacle Detection", Technical Disclosure Commons; Retrieved from http://www.tdcommons.org/dpubs_series/455, Apr. 2, 2017, 10 pages.
"Foreign Office Action", Chinese Application No. 201680038897.4, dated Jun. 29, 2020, 28 pages.
"Foreign Office Action", Chinese Application No. 201710922856.8, dated Jun. 19, 2020, 11 pages.
"Non-Final Office Action", U.S. Appl. No. 15/287,359, dated Jun. 26, 2020, 19 Pages.
"Non-Final Office Action", U.S. Appl. No. 16/503,234, dated Aug. 5, 2020, 18 Pages.
"Notice of Allowance", U.S. Appl. No. 16/401,611, dated Jun. 10, 2020, 17 Pages.
"Notice of Allowance", U.S. Appl. No. 16/252,477, dated Jun. 24, 2020, 8 Pages.
"Notice of Allowance", U.S. Appl. No. 15/093,533, dated Jul. 16, 2020, 5 Pages.
"Foreign Office Action", JP Application No. 2019-078554, dated Jul. 21, 2020, 12 pages.
"Foreign Office Action", Indian Application No. 201747044162, dated Sep. 3, 2020, 7 pages.
"Non-Final Office Action", U.S. Appl. No. 16/744,626, dated Sep. 23, 2020, 9 Pages.
"Non-Final Office Action", U.S. Appl. No. 16/669,842, dated Sep. 3, 2020, 12 pages.
"Notice of Allowance", U.S. Appl. No. 15/142,471, dated Aug. 6, 2020, 7 Pages.
"Corrected Notice of Allowance", U.S. Appl. No. 16/252,477, dated Sep. 30, 2020, 2 pages.
"Foreign Office Action", JP Application No. 2020027181, dated Nov. 17, 2020, 16 pages.
"Foreign Office Action", EP Application No. 16784352.3, dated Dec. 9, 2020, 5 pages.
"Foreign Office Action", KR Application No. 1020187004283, dated Sep. 11, 2020, 5 pages.
"Non-Final Office Action", U.S. Appl. No. 16/689,519, dated Oct. 20, 2020, 22 pages.
"Non-Final Office Action", U.S. Appl. No. 15/287,359, dated Oct. 28, 2020, 19 pages.
"Notice of Allowability", U.S. Appl. No. 16/560,085, dated Nov. 12, 2020, 2 pages.
"Notice of Allowance", U.S. Appl. No. 16/560,085, dated Oct. 19, 2020, 8 pages.
Guerra, et al., "Millimeter-Wave Personal Radars for 3D Environment Mapping", 48TH Asilomar Conference on Signals, Systems and Computer, Nov. 2014, pp. 701-705.
"Corrected Notice of Allowance", U.S. Appl. No. 16/560,085, dated Dec. 14, 2020, 2 pages.
"Notice of Allowance", U.S. Appl. No. 16/669,842, dated Dec. 18, 2020, 8 pages.

\* cited by examiner

ADVANCED GAMING AND VIRTUAL REALITY CONTROL USING RADAR

RELATED APPLICATION

This application is a continuation application claiming priority under 35 U.S.C. § 120 to U.S. patent application Ser. No. 15/286,495, titled "Advanced Gaming and Virtual Reality Control Using Radar," filed on Oct. 5, 2016, which, claims priority under 35 U.S.C. § 119(e) to U.S. Provisional Patent Application Ser. No. 62/237,975, titled "Signal Processing and Gesture Recognition," filed on Oct. 6, 2015, the disclosures of which are incorporated by reference herein in their entirety.

BACKGROUND

Current gaming and virtual reality (VR) control often uses visual tracking or hand-held controllers. Visual tracking uses optical or infrared cameras to track major body motions to control a user's game or VR environment. These cameras, however, suffer from inadequate spatial resolution, sensitivity to light and darkness, or inability to handle optical occlusions due to clothes or other objects obscuring a user's hands or body.

Current hand-held controllers do not permit the great breadth of control that is often desired to control a game, as they are limited by the number and orientation of buttons or inadequate motion-sensing sensors, such as accelerometers. Further, hand-held controllers often are nearly worthless for VR, as in VR it is desirable to know a user's body and hand orientation within the VR world, which hand-held controllers do not provide.

A partial solution to this problem involves radio-frequency (RF) techniques that track a point on a moving object. These current RF techniques, however, struggle to determine small motions without having large, complex, or expensive radar systems due to the resolution of the radar tracking system being constrained by the hardware of the radar system.

SUMMARY

This document describes techniques for advanced gaming and virtual reality control using radar. These techniques enable small motions and displacements to be tracked, even in the millimeter or submillimeter scale, for user control actions even when those actions are optically occluded or obscured, such when a user's own clothes, game tool, or fingers occlude an action or an action is obscured due to darkness or varying light. Further, these techniques enable fine resolution and real-time control, unlike conventional RF-tracking or optical-tracking techniques.

This summary is provided to introduce simplified concepts concerning advanced gaming and virtual reality control using radar, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for advanced gaming and virtual reality control using radar are described with reference to the following drawings. The same numbers are used throughout the drawings to reference like features and components.

DETAILED DESCRIPTION

Overview

Figure 1:
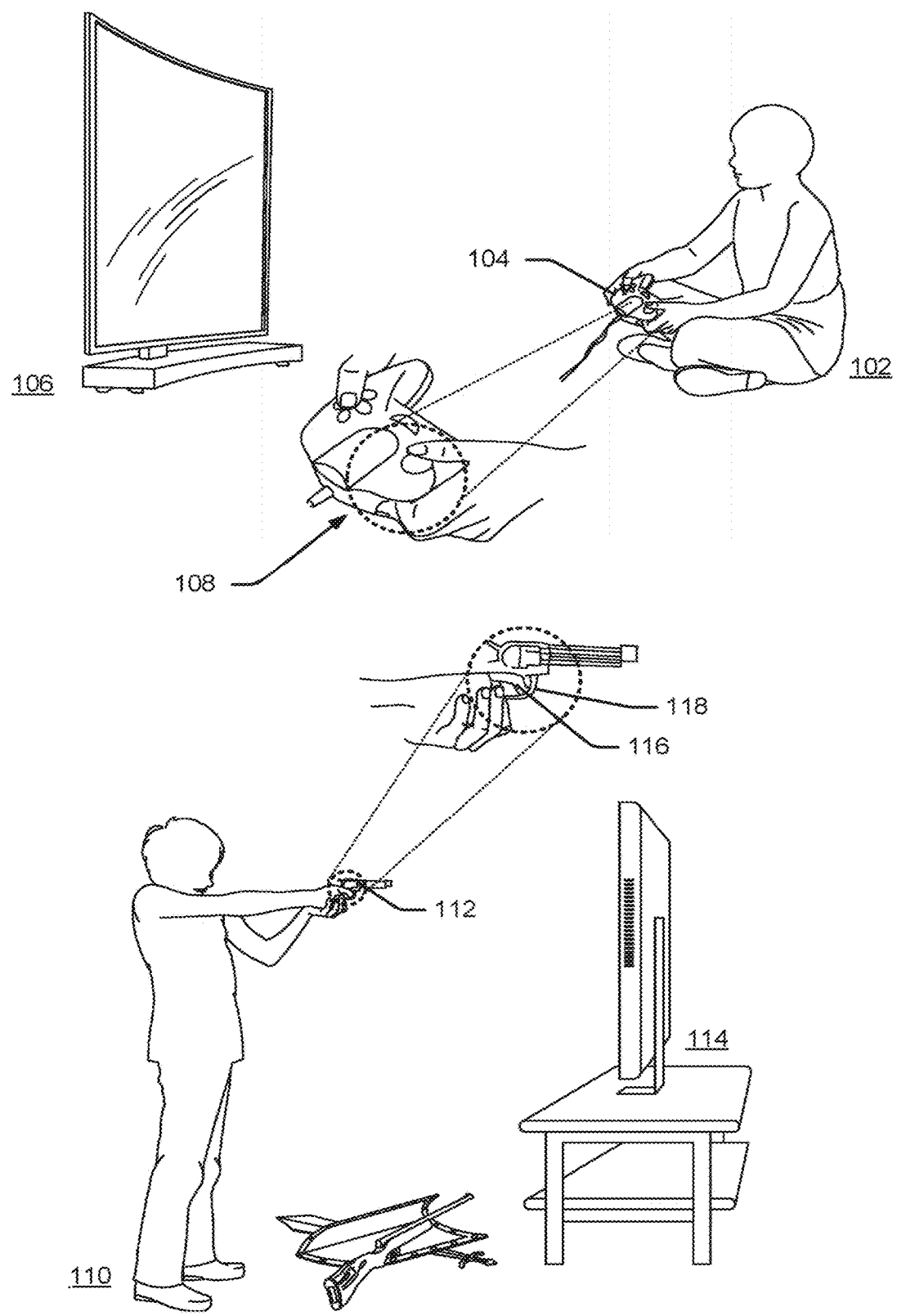
FIG. 1 illustrates two example cases in which advanced gaming and VR control using radar can be used, a user playing a video game using a mock controller and a user playing another game with a mock weapon.

Techniques are described herein that enable advanced gaming and virtual reality control using radar. These techniques enable small motions and displacements to be tracked, even in the millimeter or submillimeter scale, for user control actions even when those actions are optically occluded or obscured.

Consider, for example, a conventional optical or IR camera-enabled tracking system. This conventional system does not permit a user to use small motions or objects for control, such as just a fingertip, instead the user makes large body motions to control a game. And, for the VR world, a user represented by these conventional systems will not show finger orientation, finger movement, clothing movement or detail, as the resolution and these conventional optical or IR cameras is simply insufficient. Further still, any actions or parts of the person that are optically obscured from the camera will not be shown or shown correctly, which further limits this conventional technique.

Consider, as a second example, a conventional RF system for tracking motions and objects. The resolution of these conventional RF system is constrained by its antenna-beam width and bandwidth, both of which are based on the hardware of the conventional radar system. While somewhat better resolution can be obtained through multiple antennas, this increases complexity and cost while increasing lag-time between an action and that action being shown or its control made to the game or VR world. Even with a dozen antennas, the resolution is inferior to a single antenna using the disclosed advanced gaming and VR techniques.

In contrast to these inferior conventional techniques, consider techniques for advanced gaming and VR control using radar, which overcome hardware limitations of conventional radar systems and can recognize optically occluded or obscured motions. Consider two examples illustrated in FIG. 1. In the first, a user 102 is using a mock game controller 104 to play a video game on a computing device 106. This mock game controller 104 does not need any electronics, control capabilities, or communication capabilities by which to control the game. Further the mock game controller 104 can be obscured by being in a dark room or having shading where some part of the controller is well lit but others are dark, such as obscured portion 108. Note that in turning the mock controller 104 toward her left hand and down, that the obscured portion 108 is likely to be less-well lighted, as well as partially occluded from a radar field emitted from the computing device 106. Even so, the techniques permit the user 102 to play the game with fine motion, real-time control.

In the second example, a user 110 is using a mock weapon 112 to play a video game on computing device 114. Assume that this game is a "first person shooter" video game where the user 110 is fighting against a legion of zombies. Like many of these types of games, a player can see an oft-clumsy avatar approximation of his or her arms and feet, as well as the surrounding game world. The player can pick up supplies, tools, and weapons, which is one of the central parts of the game. In contrast to current techniques, these advanced techniques can permit the player to use and see his or her micro motions and small objects—such as a player's own arms, own hands, own feet (or an accurate representation) and their actual movements. In addition, note that the user's right index finger 116 is obscured by a trigger guard 118 of the mock weapon 112. Even so, the advanced techniques enable control through movement of the user's right index finger 116, obscured or otherwise.

The level of motion and orientation permitted by these advanced techniques can even permit the player to see his or her own self in the game world (or VR world in the case of a helmet or visor being worn), rather than a blockish avatar. Further, the player can now pick up actual mock tools and weapons and use them—even if those weapons or tools have no control capabilities. If, in the game world, a weapon is sitting on the ground, a player can pick up in the real world a plastic version of this weapon or even a toy from around the house, like a nerf gun, and use it in the game. The fine motions and ability to overcome occlusions can track the player's finger moving on the plastic trigger even when it is occluded by the weapon while also tracing movement of the weapon to aim at the zombie. All of this can be accurately and precisely shown in the VR world or game world, and enable control in the VR world or game. When the player picks up the plastic weapon, points it at the zombie, and pulls the trigger, the picking up, the pointing, and the fine motion of pulling the trigger, all can tracked by these advanced techniques.

This document now turns to an example computing device in which advanced gaming and virtual reality control using radar can be used, and then follows with an example computing device, an example radio field and occluded portion of a user's hand, a method, example RF wave propagations, and ends with an example computing system.

Example Computing Device

Figure 2:
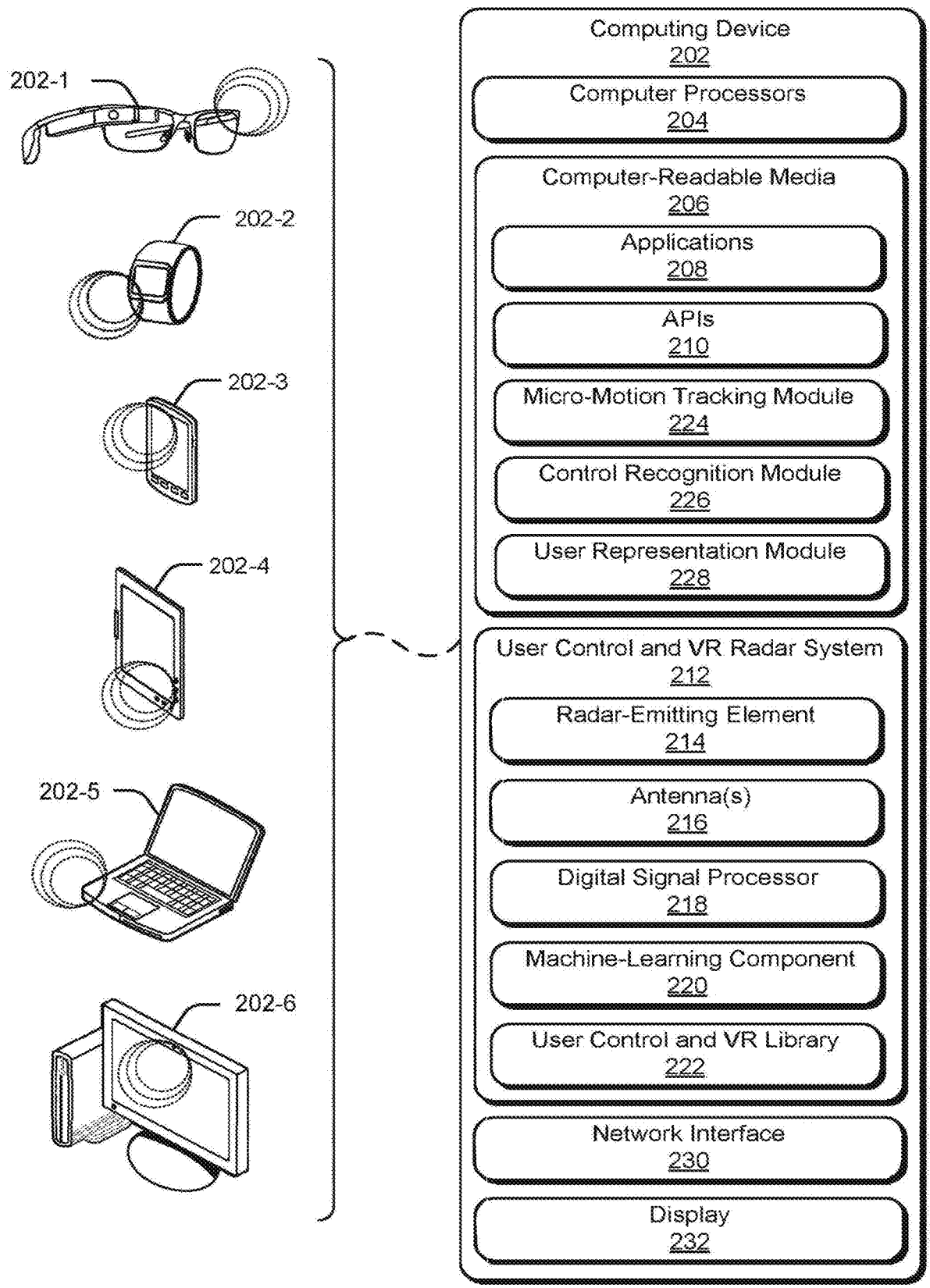
FIG. 2 illustrates an example implementation of the computing devices of FIG. 1 in greater detail, including setting out a radar system and various modules enabling the techniques.

Having generally described example uses of advanced gaming and VR control user radar, now consider FIG. 2, which illustrates an example implementation of the computing devices of FIG. 1 in greater detail. Computing device 202 represents any suitable type of computing device in which various embodiments can be implemented. In this example, various devices include, by way of example and not limitation: smart glasses 202-1, smart watch 202-2, mobile phone 202-3, tablet 202-4, laptop 202-5, and desktop computer 202-6. It is to be appreciated that these are merely examples for illustrative purposes, and that any other suitable type of computing device can be utilized without departing from the scope of the claimed subject matter, such as a netbook, dedicated gaming console, a lighting system, or an audio system.

The computing device 202 includes one or more computer processors 204 and computer-readable media 206. Applications 208 and/or an operating system (not shown) embodied as computer-readable instructions on the computer-readable media 206 can be executed by the processors 204 to invoke or interface with some or all of the functionalities described herein, such as through user control and VR Application Programming Interfaces (APIs) 210. These applications 208 may include game applications or virtual reality programs, through other non-game and non-VR programs may instead by used, such as to control media, web browsing, and so forth.

The user control and VR APIs 210 (APIs 210) provide programming access into various routines and functionality incorporated into user control and VR radar system 212 (radar system 212). In some embodiments, the APIs 210 provide high-level access into the radar system 212 in order to abstract implementation details and/or hardware access from a calling program, request notifications related to identified events, query for results, and so forth. The APIs 210 can also provide low-level access to the radar system 212, where a calling program can control direct or partial hardware configuration of the radar system 212. In some cases, the APIs 210 provide programmatic access to input configuration parameters that configure transmit signals and/or select VR or user-control recognition algorithms. These APIs enable programs, such as the applications 208, to incorporate the functionality provided by the radar system 212 into executable code. For instance, the applications 208 can call or invoke APIs 210 to register for, or request, an event notification when a particular micro-motion user control has been detected, enable or disable wireless gesture recognition in the computing device 202, and so forth. At times, the APIs 210 can access and/or include low-level hardware drivers that interface with hardware implementations of the radar system 212. Alternately or additionally, the APIs 210 can be used to access various algorithms that reside on the radar system 212 to configure algorithms, extract additional information (such as 3D tracking information, angular extent, reflectivity profiles from different aspects, correlations between transforms/features from different channels), change an operating mode of the radar system 212, and so forth.

The radar system 212 is shown separate from the computer-readable media 206, though it may contain computer-readable instructions. Thus, the radar system 212 can be implemented in part as a chip embedded within the computing device 202, such as a System-on-Chip (SoC), one or more Integrated Circuits (ICs), as a processor with embedded processor instructions, or configured to access processor instructions stored in memory, as hardware with embedded firmware, a printed circuit board with various hardware components, or any combination thereof. Here, the radar system 212 includes a radar-emitting element 214, one or more antennas 216, a digital signal processor 218, a machine-learning component 220, and a user-control and VR library 222. In conjunction with micro-motion tracking module 224, control recognition module 226, and/or user representation module 228 (each described below), the radar system 212 can enable advanced gaming and virtual reality control, even for millimeter-scale and occluded or obscured movements.

Generally, the radar-emitting element 214 is configured to provide a radar field. The radar field is configured to at least partially reflect off a target object. The radar field can also be configured to penetrate fabric or other obstructions and reflect from human tissue, such as a gaming implement (e.g., a mock game controller, weapon, or tool). These fabrics or obstructions can include wood, glass, plastic, cotton, wool, nylon and similar fibers, and so forth, while reflecting from human tissues, such as a person's hand. The radar field may also reflect from objects, such as a part of a game controller, trigger on a mock weapon, or button on a mock tool to discern small motions, or even larger motions, such as movement of a tool or pointing of a mock weapon.

A radar field can be a small size, such as 1 millimeter to 10 centimeters, moderate, such as 10 centimeters to 1.5 meters, or moderately large, such as 0.5 to 8 meters (or larger). It is to be appreciated that these sizes are merely for discussion purposes, and that any other suitable range can be used. The radar system 212 and modules 224, 226, or 228 can receive and process reflections of the radar field to provide large-body gestures based on reflections from human tissue caused by body, arm, or leg movements, either alone or in conjunction with small motions. Multiple radar fields can be used, or one field that enables determination of both small and large movements as noted below. Example uses of both large and small motion and position detection include determining a position of a user in three dimensions and large movements for the user, such as arm, leg, or a larger object's position or movement. These, along with small movements, such as fingers and the like, can be combined for realistic VR representations of the user, or for combined user control actions, like both pointing a mock weapon and pulling the trigger.

The antennas 216 receive RF signals. These antennas 216 (or a single antenna) can receive various types of reflections, such as a radar signal representing a superposition of reflections of two or more points within the radar field provided by the radar-emitting element 214 of the radar system 212. Often, one of the first or second points will be optically occluded. This optical occlusion resides between the antenna 216 and the point that is optically occluded. Example occlusions include mock or real game controllers, mock tools or weapons, food, gloves, clothing, books, other electronic devices, and so forth. Furthermore, often one of these points will be visually obscured. A point on an object is visually obscured with the lighting of that point is dark or otherwise difficult to optically capture, such as when the point is dark relative to at least another of the two or more points or to an ambient lighting of objects within the radar field. Consider, for example, the user 102 of FIG. 1, and her mock game controller 104. If she is sitting in a dark room, which is often the case for game playing, or even in a well-lighted room, as she moves the controller and her hands, buttons of the controller or her fingers can easily have substantial lighting changes, including those that make them difficult to optically capture.

These antennas 216 can be configured as a dipole antenna, a parabolic antenna, a helical antenna, a monopole antenna, and so forth. In some embodiments, the antennas 216 are constructed on-chip (e.g., as part of an SoC), while in other embodiments, the antennas 216 are separate components, metal, hardware, etc. that attach to, or are included within, the radar system 212. The placement, size, and/or shape of the antennas 212 can be chosen to enhance a specific transmission pattern or diversity scheme, such as a pattern or scheme designed to capture information about a microgesture performed by the hand, as further described above and below.

The digital signal processor 218 generally represents digitally capturing and processing a signal. For instance, the digital signal processor 218 samples analog RF signals received by the antennas 216 to generate digital samples that represents the RF signals, and then processes these samples to extract information about the target object. Alternately or additionally, the digital signal processor 218 controls the configuration of signals generated and transmitted by the radar-emitting element 214 and/or antennas 216, such as configuring a plurality of signals to form a specific diversity scheme like a beamforming diversity scheme. In some cases, the digital signal processor 218 receives input configuration parameters that control an RF signal's transmission parameters (e.g., frequency channel, power level), such as through the APIs 210. In turn, the digital signal processor 218 modifies the RF signal based upon the input configuration parameter. At times, the signal processing functions of the digital signal processor 218 are included in a library of signal processing functions or algorithms that are also accessible and/or configurable via the APIs 210. The digital signal processor 218 can be implemented in hardware, software, firmware, or any combination thereof.

Among other things, the machine-learning component 220 receives information processed or extracted by the digital signal processor 218, and uses that information to classify or recognize various aspects of the target object. In some cases, the machine-learning component 220 applies one or more algorithms to probabilistically determine which gesture has occurred given an input signal and previously learned gesture features. As in the case of the digital signal processor 218, the machine-learning component 220 can include a library of multiple machine-learning algorithms, such as a Random Forrest algorithm, deep-learning algorithms (e.g., artificial neural network algorithms, convolutional neural net algorithms), clustering algorithms, Bayesian algorithms, and so forth. The machine-learning component 220 can be trained on how to identify various gestures using input data that consists of example gesture(s) to learn. In turn, the machine-learning component 220 uses the input data to learn what features can be attributed to a specific gesture. These features are then used to identify when the specific gesture occurs. In some embodiments, the APIs 210 can be used to configure the machine-learning component 220 and/or its corresponding algorithms.

The user control and VR library 222 represents data used by the digital signal processor 218, the machine-learning component 220, and/or modules of FIG. 2, to identify a target object and/or user control actions or movements performed by the target object. For instance, the user control and VR library 222 can store signal characteristics, or characteristics about a target object that are discernable from a signal, such as a particular mock tool, mock controller, and so forth. By so doing, these objects can be tracked and also differentiated from other signals, such as those of a person arm or hand.

In addition, certain data stored in user control and VR library 222 may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Generally, the micro-motion tracking module 224 is configured to determine displacement of a point, or a relative displacement between points, determined from a radar signal representing reflections of one or more points within the radar field. In the case of a single point, the micro-motion tracking module 224 is configured to differentiate the point from other points, and then, based on an energy and velocity of the part of the signal associated with the point, determine a velocity of the point. In the case of multiple points, the micro-motion tracking module 224 is configured to determine a relative displacement between a first and second point of the multiple points. At least one of these points is associated with a user—in some cases a point is associated by being part of the user and in others the point is of something touched by the user, such as a mock controller (a lever or button), weapon (a trigger), or tool. Also, even though at least one of these points is occluded or obscured, the micro-motion tracking module 224 is able to spatially resolve the first and second points to provide at least a relative velocity or displacement of the points relative to each other or some third point. As noted in part above, the resolving can be at a resolution finer than a wavelength of the radar field provided by the radar system. Thus, as the wavelength is a constrain of the hardware of the system, the techniques described herein overcome that hardware constraint.

In more detail, the micro-motion tacking module 224 may determine a relative displacement by measuring a radial distance for each of the first and second points using a time delay between transmittal of the radar field and receiving the radar signal, measuring a radial velocity through an observed Doppler frequency for each of the first and second points, and measuring a reflected energy for each of the first and second points. This may be performed instead or in conjunction by components of the radar system 212 as well. Assume, for example, that the radar signal includes two sets of data, each set of data from one of two radar emitter-antenna pairs. In such a case, measuring the radial velocity can be through a range-Doppler map for one of the first or second points, per set of data. Also, this relative displacement can be calculated over a time series effective to track the first and second points over multiple relative displacements over time.

The micro-motion tracking module 224 may also, prior to determining the displacement, distinguish the point or points. In some cases this is performed by tracking temporal changes in the radar signal. This distinguishing can be performed by determine a micro-Doppler centroid for each point of interest, respectively. Thus, distinguishing points can be based on one of the first or second point having a different characteristic to a signal associated with the one of the first or second points than another signal associated with another of the first or second points.

In the case of occlusions, the micro-motion tracking module 224 can distinguish points prior to one of the points being optically occluded by tracking the points over time and then determining that one of the points is optically occluded based on an alteration of a characteristic of a signal associated with the optically occluded point. With this alteration known, further distinguishing and tracking can be performed based on the altered characteristic of the signal associated the occluded point. And, when the point that is occluded ceases to be occluded this change to the signal can also be noted, and back and forth. Thus, a finger on a mock controller can be tracked prior to occlusion, then the finger is occluded by the controller and tracked as an occluded point based on the altered signal, and then when no longer occluded by the controller the finger is tracked with the alteration no longer preset.

Figure 3:
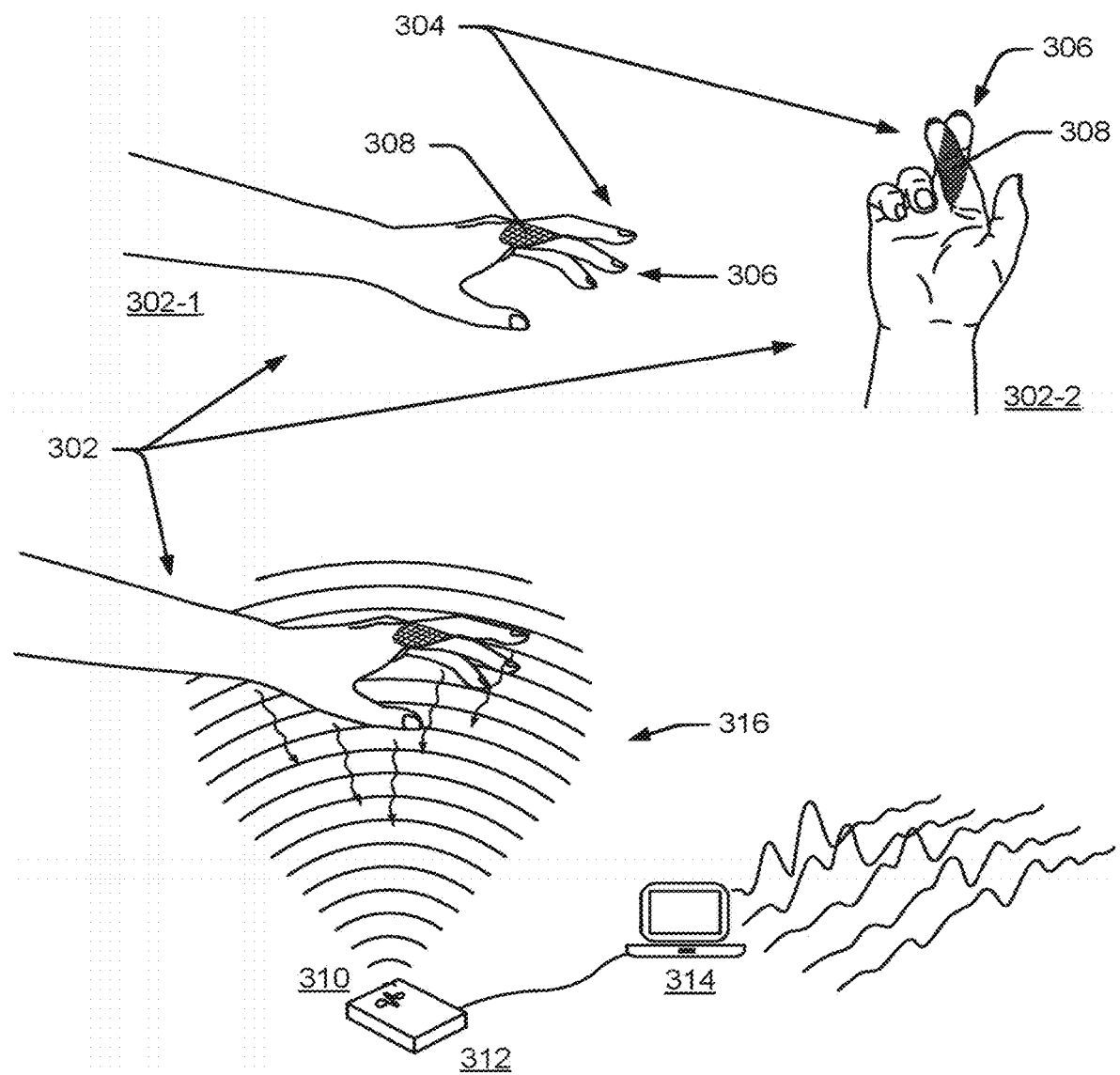
FIG. 3 illustrates a hand acting within a provided radar field, including an occluded portion of an index finger, as well as an example radar system and computing device.

Consider, for example, FIG. 3, which illustrates a user's hand 302 (shown in side view 302-1 and bottom view 302-2), an index finger 304, and a middle finger 306. Note that a portion of the index finger 304, occluded portion 308, is occluded relative to antenna 310 of radar system 312, shown as a peripheral of a computing device 314. The techniques, here through the micro-motion tracking module 224 of FIG. 2, can track even the occluded portion 308 of the index finger 304. Other aspects of FIG. 3 are described in the context of methods discussed below.

Returning to FIG. 2, generally, the control recognition module 226 is configured to determine a user control action based on the displacement of a point tracked by the micro-motion tracking module 224, or based on the relative displacement between two or more points also tracked by the micro-motion tracking module 224. This control action can be one on many different types and sizes of control actions, from fine motion, millimeter-scale control of a level or button or wheel on a mock game controller, a partially-occluded in-the-air gesture of a hand and fingers, a user pulling a trigger of a mock weapon, or larger-scale control, such as picking up a shield and moving it to block a game-opponent's sword strike, aiming a weapon at a zombie, or even jumping up to avoid a VR or game-world snare. The control recognition module 226 may recognize movements that are previously cataloged or simply determine the motion and pass the motion in a format usable by one of the applications 208 through the APIs 210. A movement of a trigger or putting a shield up to deflect a blow need not be cataloged or previously known gesture or action. Some actions and movements, however, are known and, in such cases, the user control and VR library 222 is used to determine the particular command or action desired by the movement. Thus, the user control need not be a particular gesture, but may instead by a movement, e.g., that the user 102 has pressed lever A forward ¼ or that the user 108 has moved the mock weapon 110 some number of degrees in a direction and then moved his index finger (pulling the trigger) some distance.

Generally, the user representation module 228 is configured to determine a user's representation based on a displacement or relative displacement of points associated with the user, which may include data that is solely in the millimeter scale but may also include data that is of a larger scale, whether provided by the radar system or other sensing system. Thus, the user representation module 228 may determine fine motions based on displacement or motion from the micro-motion tracking module 224, but may also, from the radar system or even an optical or IR camera, receiving data indicating a user's stance, position, or large motions.

In more detail, the user representation module 228 is configured to determine a location in three dimensions, or relative to a user, for one or more points based on a displacement or relative displacement between points. Data indicating a position of the user may also be used. Thus, assume that the user representation module 228 knows a user's general body location of feet, legs, arms, and centroid of a hand (but not detail of the hand) Based on this, the user representation module 228 may place the fingers for the hand based on the fine displacement from the radar system, and well as their fine, real-time movement for the hand With this, the game or VR world is given sufficient information to accurately place the user and the user's fine motions in the game or VR world.

The computing device 202 may also include one or more network interfaces 230 for communicating data over wired, wireless, or optical networks and a display 232. The network interface 230 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like. The display 232 can be integral with the computing device 202 or associated with it, such as with the desktop computer 202-6.

Having described the computing device 202 in accordance with one or more embodiments, now consider example methods for advanced gaming and VR control using radar.

Example Method

Figure 4:
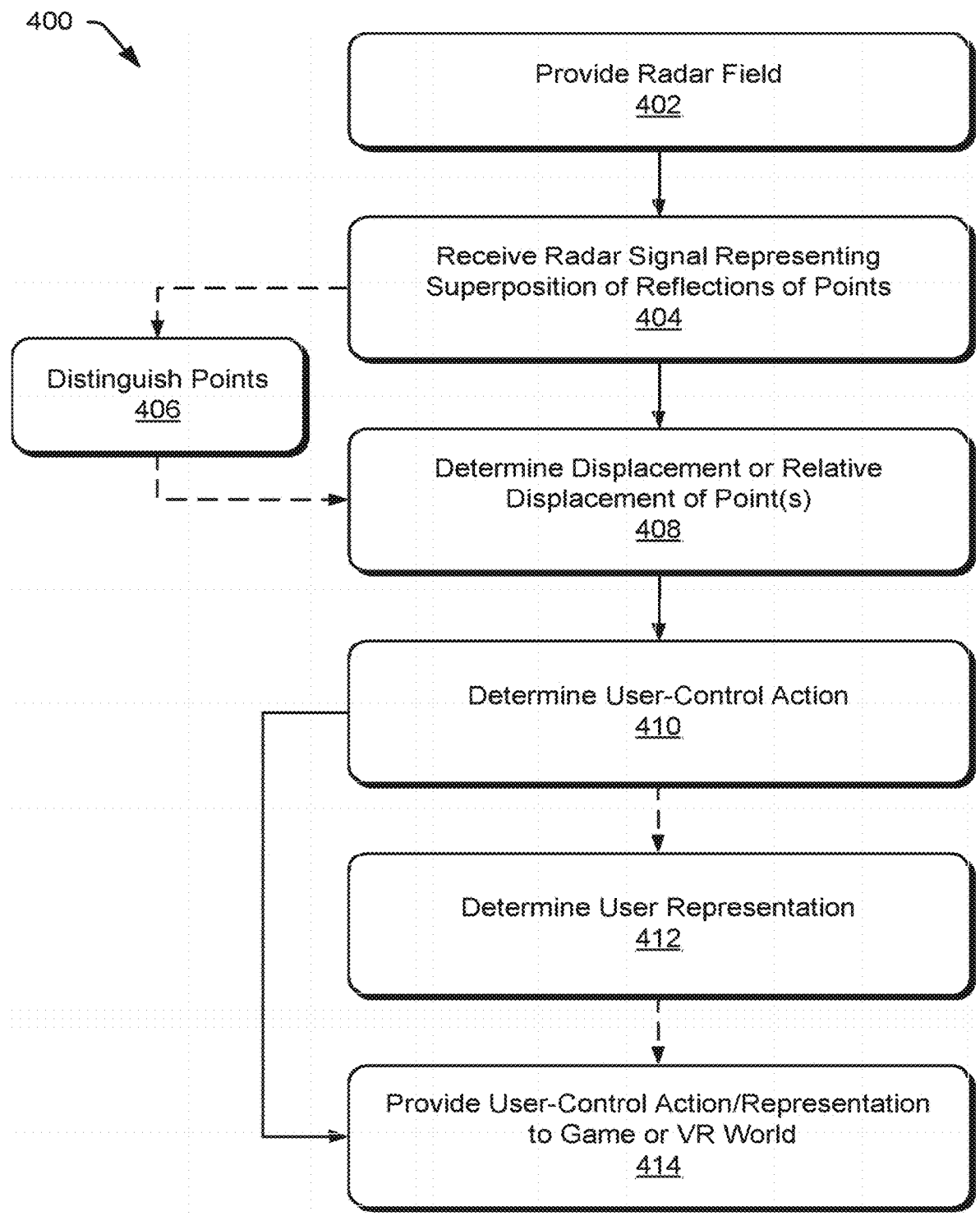
FIG. 4 illustrates an example method for advanced gaming and virtual reality control using radar.

FIG. 4 depicts a method 400 for advanced gaming and virtual reality control using radar. The method 400 receives a radar signal from a radar system in which a hand, object, or person's body makes a movement, determines a displacement at a finer resolution than conventional techniques permit based on the parameters of the radar system, and then, based on this displacement, determines user control actions or a user's representation, even in a millimeter or submillimeter scale. This method is shown as sets of blocks that specify operations performed but are not necessarily limited to the order or combinations shown for performing the operations by the respective blocks. In portions of the following discussion reference may be made to FIGS. 1-3 and 5-7, reference to which is made for example only. The techniques are not limited to performance by one entity or multiple entities operating on one device, or those described in these figures.

At 402, a radar field is provided, such as shown in FIG. 3 at radar field 316. The radar field can be provided by a simple radar system, including existing WiFi radar, and need not use complex, multi-emitter or multi-antenna, or narrow-beam scanning radars. Instead, a broad beam, full contiguous radar field can be used, such as 57-64 or 59-61 GHz, though other frequency bands, even sounds waves, can be used.

At 404, a radar signal representing a superposition of reflections of points within the radar field are received. As noted, at least one of the points can be optically occluded or obscured. In the case of an optical occlusion, an object resides between a radar antenna of the radar system and the point that is optically occluded. An example of this is shown in FIG. 3 at the occluded portion 308 of the index finger 304.

At 406, optionally and prior to block 408, two or more points are distinguished by tracking temporal changes in the radar signal. As noted above, this can be done by the micro-motion tracking module 224 by determining micro-Doppler centroids for the points.

At 408, a relative displacement between a point or multiple of the points is determined by spatially resolving the points. Note that a single displacement can be determined by the techniques, though very fine displacements can be determined more accurately or with fewer computing resources when the relative displacement between two points is determined.

At 410, a user control action is determined based on the displacement or relative displacement of the point or first and second points. Note that this can simply be provided effective to enable determination of the user control action. This is described in detail above. Also as noted in part above, a movement common to two points can be determined and this movement or displacement passed—this can aid in determining movement of a gaming implement. Thus, the techniques may determine, based on a movement of a centroid of the combination of the points, a movement of a game implement. If the techniques track a front of a mock weapon and track a user's finger the mock weapon, the common movement tracks the mock weapon, such as to point it at a particular spot on the displace of the computing device. The techniques can also determine a position of a user or larger objects, like an arm, leg, or tool. This position can be used with the fine motions to provide additional control or a more accurate representation of the user in the game or VR world.

At 412, optionally a representation of the user is determined, such as by the user representation module 228 described above. In such a case, a displacement of a point in three dimensions or relative to a user is determined.

At 414, the user control action and/or user representation is provided, such as to a game or VR application. In the case of the user control action, the relative or absolute displacement or velocity can be passed sufficient to enable the user's movement of him or herself, or a tool or object associated with him or her, to be passed to an application. In the case of a user representation, a position, e.g., in three dimension, or relative to the user is passed to a game or VR program to represent, in a game user interface or a virtual reality world, respectively, points associated with the user.

Through operations of method 400 and as noted above, relative dynamics are extracted from the radar signal representing the superposition of the reflections of multiple points within the radar field. These relative dynamics indicate a displacement of points relative one to another, from which micro-motions and larger movements can be determined. As noted above, in some cases extracting relative dynamics from the superposition determines micro-Doppler centroids for the points. These micro-Doppler centroids enable computationally light super-resolution velocity estimates to be determined. Thus, the computational resources needed are relatively low compared to conventional radar techniques, further enabling use of these RF-based micro-motion techniques in small or resource-limited devices, such as some wearable devices and appliances. Not only can these techniques be used on resource-limited devices, but the computationally light determination can permit faster response to a user action, such as in real time as a small, fine motion to move a dummy physical controller or maneuver a tool.

Further, the RF-based micro-motion techniques, by using micro-Doppler centroids, permits greater robustness to noise and clutter than use of Doppler profile peaks. To increase resolution, the micro-motion tracking module 224 may use the phase change of the radar signal to extract millimeter and sub-millimeter displacements for high-frequency movements of the points.

Example RF Signal Propagation in Radar-Based Gesture Devices

Having discussed example apparatuses and methods for advanced gaming and virtual reality control using radar, the discussion now turns to example manners in which RF radar can be used. Consider FIG. 5, which illustrates a simple example of RF source-wave propagation, and a corresponding reflected-wave propagation. The following discussion has been simplified, and is not intended to describe all technical aspects of RF source-wave propagation, reflected-wave propagation, or user-control action and micro-motion determination and detection techniques.

Environment 500 includes a source device 502 and an object 504. The source device 502 includes an emitter/receive antenna 506, which generally represents functionality configured to transmit and receive electromagnetic waves in the form of an RF signal. The emitter/receiver antenna 506 can be coupled to a source, such as a radar-emitting element (e.g., the radar-emitting element 214), to achieve transmission of a signal. In this example, the source device 502 transmits a series of RF pulses, illustrated here as the RF pulse 508-1, the RF pulse 508-2, and the RF pulse 508-3. As indicated by their ordering and distance from the source device 502, the RF pulse 508-3 is transmitted first in time, followed by the RF pulse 508-2, and then the RF pulse 508-1. For discussion purposes, these RF pulses have the same pulse width, power level, and transmission periodicity between pulses, but another suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. The environment 500 also illustrates the reflection of RF pulses 508-1, 2, and 3 reflecting off of the object 504, where an RF pulse 510-1 corresponds to a reflection originating from the RF pulse 508-1 reflecting off of the object 504, the RF pulse 510-2 corresponds to a reflection originating from the RF pulse 508-2, and so forth. In this simple case, the source device 502 and the object 504 are stationary, and the RF pulses 508-1, 2, and 3 are transmitted via a single antenna (the antenna 506) over a same RF channel, and are transmitted directly towards the object 504 with a perpendicular impact angle. Similarly, the RF pulses 510, 1, 2, and 3 are shown as reflecting directly back to the source device 502, rather than with some angular deviation. However, as one skilled in the art will appreciate, these signals can alternately be transmitted or reflected with variations in their transmission and reflection directions based upon the configuration of the source device 502, the object 504, transmission parameters, variations in real-world factors, and so forth. Upon receiving and capturing the RF pulses 510, 1, 2, and 3, the source device 502 can then analyze the pulses, either individually or in combination, to identify characteristics related to the object 504. For example, the source device 502 can analyze all of the received RF pulses to obtain temporal information and/or spatial information about the object 504. Accordingly, the source device 502 can use knowledge about a transmission signal's configuration (such as pulse widths, spacing between pulses, pulse power levels, phase relationships, and so forth), and further analyze a reflected RF pulse to identify various characteristics about the object 504, such as size, shape, movement speed, movement direction, surface smoothness, material composition, and so forth.

Figure 5:
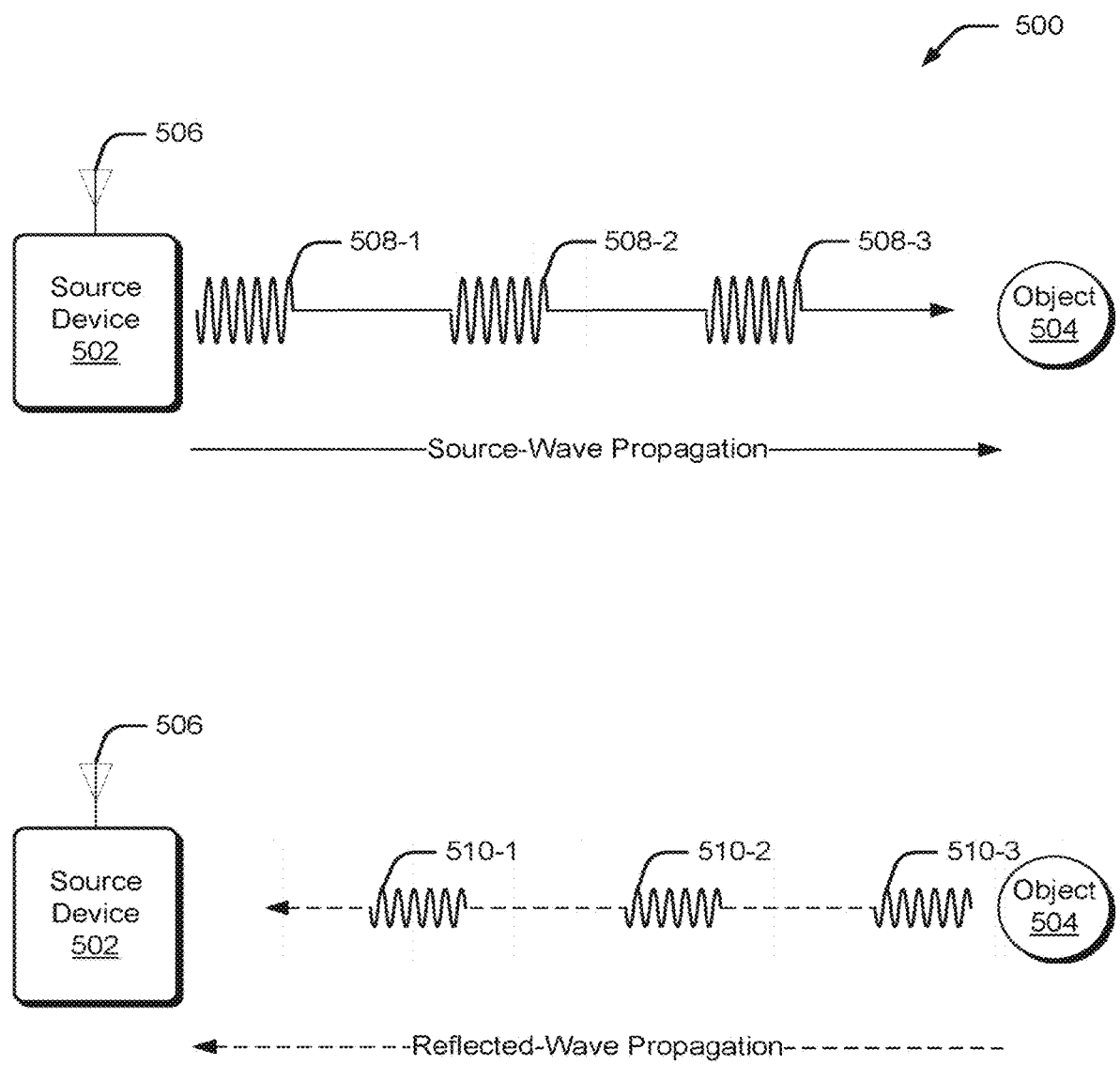
FIG. 5 illustrates a simple example of RF source-wave propagation and a corresponding reflected-wave propagation.
Figure 6:
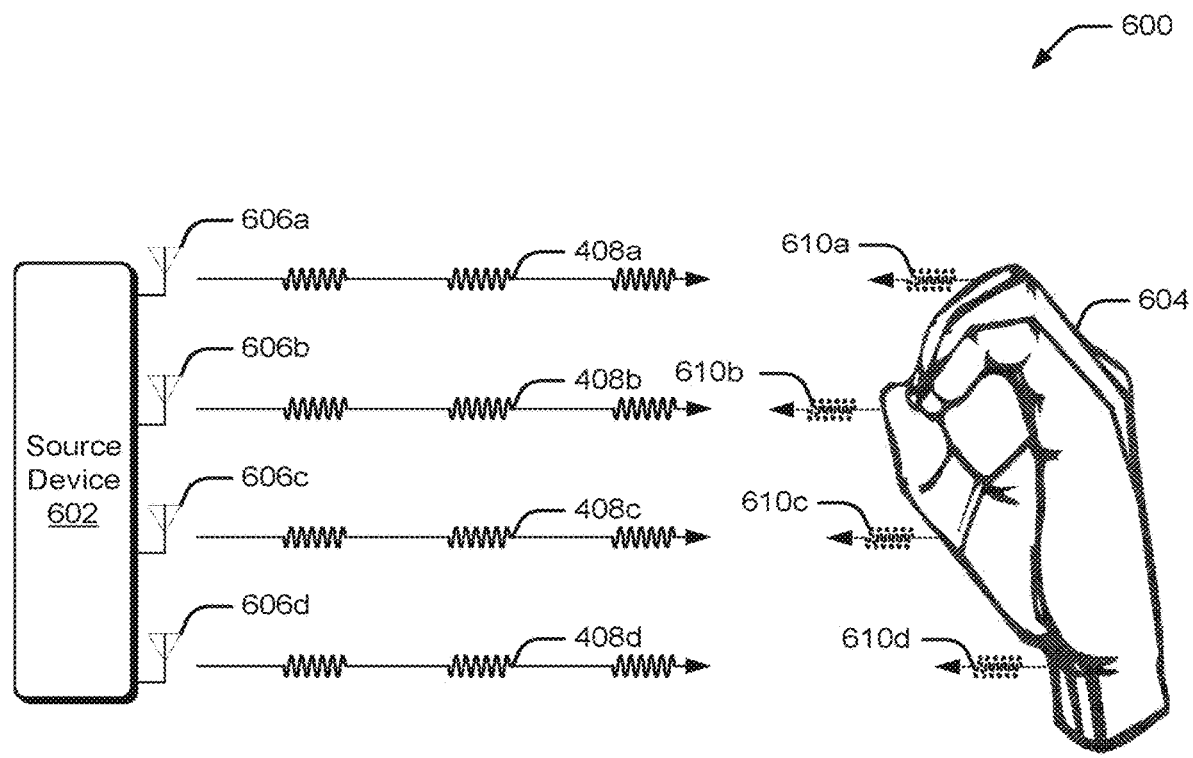
FIG. 6. illustrates an example environment in which multiple antenna are used to receive information about a target object.

Now consider FIG. 6, which builds upon the above discussion of FIG. 5. FIG. 6 illustrates example environment 600 in which multiple antenna are used to ascertain information about a target object. The environment 600 includes the source device 602 and a target object, shown here as hand 604. Generally speaking, the source device 602 includes antennas 606 to transmit and receive multiple RF signals. In some embodiments, the source device 602 includes the radar system 212 and modules of FIG. 2. The antennas 606 correspond to the antennas 216. While the source device 602 in this example includes four antennas, it is to be appreciated that any suitable number of antennas can be used. Each antenna of the antennas 606 is used by the source device 602 to transmit a respective RF signal (e.g., antenna 606-1 transmits RF signal 608-1, antenna 606-2 transmits RF signal 608-2, and so forth). As discussed above, these RF signals can be configured to form a specific transmission pattern or diversity scheme when transmitted together. For example, the configuration of the RF signals 608, as well as the placement of the antennas 606 relative to a target object, can be based upon beamforming techniques to produce constructive interference or destructive interference patterns, or alternately configured to support triangulation techniques. At times, the source device 602 configures the RF signals 608 based upon an expected information extraction algorithm, as further described below.

When the RF signals 608 reach the hand 604, they generate reflected RF signals 610. Similar to the discussion of FIG. 5 above, the source device 602 captures these reflected RF signals, and then analyzes them to identify various properties or characteristics of the hand 604, such as a millimeter-scale movement. For instance, in this example, the RF signals 608 are illustrated with the bursts of the respective signals being transmitted synchronously in time. In turn, and based upon the shape and positioning of the hand 604, the reflected signals 610 return to the source device 602 at different points in time (e.g., the reflected signal 610-2 is received first, followed by the reflected signal 610-3, then the reflected signal 610-1, and then the reflected signal 610-4). The reflected signals 610 can be received by the source device 602 in any suitable manner. For example, the antennas 606 can each receive all of the reflected signals 610, or receive varying subset combinations of the reflected signals 610 (e.g., the antenna 606-1 receives the reflected signal 610-1 and the reflected signal 610-4, the antenna 606-2 receives the reflected signal 610-1, the reflected signal 610-2, and the reflected signal 610-3, etc.). Thus, each antenna can receive reflected signals generated by transmissions from another antenna. By analyzing the various return times of each reflected signal, the source device 602 can determine shape and corresponding distance information associated with the hand 604. When reflected pulses are analyzed over time, the source device 602 can additionally discern movement. Thus, by analyzing various properties of the reflected signals, as well as the transmitted signals, various information about the hand 604 can be extracted, as further described below. It is to be appreciated that the above example has been simplified for discussion purposes, and is not intended to be limiting.

As in the case of FIG. 5, FIG. 6 illustrates the RF signals 608 as propagating at a 90° angle from the source device 602 and in phase with one another. Similarly, the reflected signals 610 each propagate back at a 90° angle from the hand 604 and, as in the case of the RF signals 608, are in phase with one another. However, as one skilled in the art will appreciate, more-complex transmission signal configurations, and signal analysis on the reflected signals, can be utilized, examples of which are provided above and below. In some embodiments, the RF signals 608 can each be configured with different directional transmission angles, signal phases, power levels, modulation schemes, RF transmission channels, and so forth. These differences result in variations between the reflected signals 610. In turn, these variations each provide different perspectives of the target object which can be combined using data fusion techniques to yield a better estimate of the hand 604, how it is moving, its three-dimensional (3D) spatial profile, a corresponding user control action, and so forth.

Example Computing System

Figure 7:
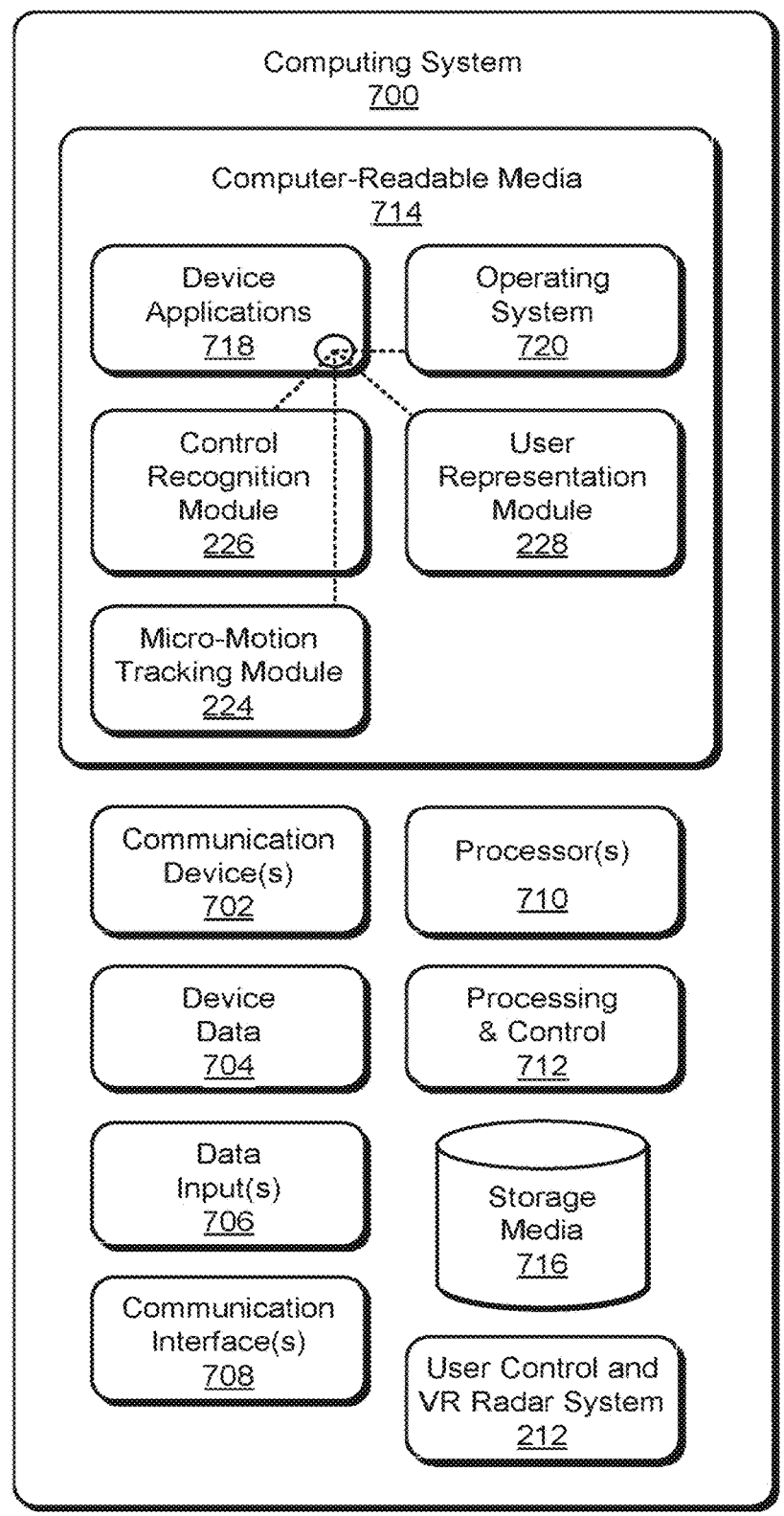
FIG. 7 illustrates an example computing system embodying, or in which techniques may be implemented that enable use of, advanced gaming and virtual reality control using radar.

FIG. 7 illustrates various components of an example computing system 700 that can be implemented as any type of client, server, and/or computing device as described with reference to the previous FIGS. 1-6 to implement advanced gaming and virtual reality control using radar.

The computing system 700 includes communication devices 702 that enable wired and/or wireless communication of device data 704 (e.g., received data, data that is being received, data scheduled for broadcast, data packets of the data, etc.). Device data 704 or other device content can include configuration settings of the device, media content stored on the device, and/or information associated with a user of the device (e.g., an identity of an actor performing an action). Media content stored on the computing system 700 can include any type of audio, video, and/or image data. The computing system 700 includes one or more data inputs 706 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

The computing system 700 also includes communication interfaces 708, which can be implemented as any one or more of a serial and/or parallel interface, a wireless interface, any type of network interface, a modem, and as any other type of communication interface. Communication interfaces 708 provide a connection and/or communication links between the computing system 700 and a communication network by which other electronic, computing, and communication devices communicate data with the computing system 700.

The computing system 700 includes one or more processors 710 (e.g., any of microprocessors, controllers, and the like), which process various computer-executable instructions to control the operation of the computing system 700 and to enable techniques for, or in which can be embodied, advanced gaming and virtual reality control using radar. Alternatively or in addition, the computing system 700 can be implemented with any one or combination of hardware, firmware, or fixed logic circuitry that is implemented in connection with processing and control circuits, which are generally identified at 712. Although not shown, the computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 700 also includes computer-readable media 714, such as one or more memory devices that enable persistent and/or non-transitory data storage (in contrast to mere signal transmission), examples of which include random access memory (RAM), non-volatile memory (e.g., any one or more of a read-only memory (ROM), flash memory, EPROM, EEPROM), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 700 can also include a mass storage media device (storage media) 716 and the user control and VR radar system 212 and its various components.

The computer-readable media 714 provides data storage mechanisms to store the device data 704, as well as various device applications 718 and any other types of information and/or data related to operational aspects of the computing system 700. For example, an operating system 720 can be maintained as a computer application with the computer-readable media 714 and executed on the processors 710. The device applications 718 may include a device manager, such as any form of a control application, software application, signal-processing and control module, code that is native to a particular device, an abstraction module or gesture module and so on. The device applications 718 also include system components, engines, or managers to implement advanced gaming and virtual reality control using radar, such as the micro-motion tracking module 224, the control-recognition module 226, and the user representation module 228.

The computing system 700 may also include, or have access to, one or more of radar systems, such as the radar system 212 having the radar-emitting element 214 and the antenna element 216. While not shown, one or more components of the micro-motion tracking module 224, the control recognition module 226, or the user representation module 228 may be operated, in whole or in part, through hardware or firmware.

Conclusion

Although techniques using, and apparatuses including, advanced gaming and virtual reality control using radar have been described in language specific to features and/or methods, it is to be understood that the subject of the appended claims is not necessarily limited to the specific features or methods described. Rather, the specific features and methods are disclosed as example implementations of ways in which to determine advanced gaming and virtual reality control using radar.

We claim:

1. A computer-implemented method for determining a user control action in a gaming or virtual reality environment, the computer-implemented method comprising:
   providing a radar field by a radar system;
   receiving a radar signal representing a superposition of reflections of first and second points within the radar field, at least one of the first or second points being on a portion of a user;
   determining, based on the radar signal, a relative displacement between the first and second points by spatially resolving the first and second points;
   determining the user control action for a gaming or virtual reality application based on the relative displacement between the first and second points; or
   providing the relative displacement between the first and second points effective to enable determination of the user control action by the gaming or virtual reality application;
   determining locations in three dimensions, or relative to the user, of the first and second points; and
   representing, in a game user interface or a virtual reality world associated with the gaming or virtual reality application, the first and second points; or
   passing the locations of the first and second points to the gaming or virtual reality application effective to enable the gaming or virtual reality application to represent the first and second points within the game user interface or the virtual reality world.

2. The computer-implemented method of claim 1, wherein the providing the relative displacement and the passing the locations of the first and second points are performed through an application programming interface.

3. The computer-implemented method of claim 1, further comprising distinguishing the first and second points within the radar signal based on micro-Doppler centroids for the first and second points.

4. The computer-implemented method of claim 1, wherein spatially resolving the first and second points comprises measuring:
 a radial distance for the first and second points using a time delay between transmittal of the radar field and reception of the radar signal;
 a radial velocity measured through an observed Doppler frequency for the first and second points; and
 a reflected energy for the first and second points.

5. The computer-implemented method of claim 1, wherein the representing, in the game user interface or the virtual reality world associated with the gaming or virtual reality application comprises producing a representation of the portion of the user within the game user interface or the virtual reality world associated with the gaming or virtual reality application.

6. The computer-implemented method of claim 1, wherein the determining the locations of the first and second points is based on a determined position of another portion of the user relative to the first and second points.

7. The computer-implemented method of claim 6, wherein:
 the radar signal further represents a superposition of a third point; and
 the determined position of the other portion of the user is based on a displacement of the third point relative to the first and second points.

8. The computer-implemented method of claim 1, wherein another of the first or second points is a portion of a gaming implement.

9. The computer-implemented method of claim 8, wherein the gaming implement is a mock game controller, the mock game controller not having control or communication capabilities.

10. The computer-implemented method of claim 8, wherein representing the first and second points within the game user interface or the virtual reality world comprises producing a representation of the gaming implement within the game user interface or the virtual reality world.

11. An apparatus comprising:
 one or more computer processors;
 a radar system comprising:
  one or more radar-emitting elements configured to provide a radar field; and
  one or more antenna elements configured to receive a radar signal representing a superposition of reflections of the radar field off two or more points that are within the radar field provided by the radar system; and
 one or more computer-readable storage media having instructions stored thereon that, responsive to execution by the one or more computer processors, implement a micro-motion tracking module and a control recognition module:
  the micro-motion tracking module configured to determine a relative displacement between a first and second point of the two or more points, at least one of the first and second points being on a portion of a user, the determination performed by spatially resolving the first and second points; and
  the control recognition module configured to:
   determine a user-control action based on the relative displacement between the first and second points; and
   pass the user-control action to a game application or virtual reality program.

12. The apparatus of claim 11, wherein the apparatus is configured as smart glasses, a smart watch, a virtual or augmented reality system, a gaming system, a mobile phone, a tablet, a laptop, or a desktop computer.

13. The apparatus of claim 11, wherein the user-control action is passed to the game application or the virtual reality program via an application programming interface (API).

14. The apparatus of claim 11, wherein the instructions, responsive to execution by the one or more computer processors, further implements a user representation module configured to:
 determine a location in three dimensions, or relative to the user, for the first and second points based on the relative displacement between the first and second points and data indicating a position of the user; and
 pass the location in three dimension or relative to the user effective to enable the game application or the virtual reality program to represent, in a game user interface or a virtual reality world, respectively, of movement of the first and second points.

15. The apparatus of claim 14, wherein the representation of movement of the first and second points within the game user interface or the virtual reality world comprises producing a representation of the portion of the user within the game user interface or the virtual reality world.

16. The apparatus of claim 14, wherein:
 another of the first or second points is a portion of a gaming implement; and
 the representation of movement of the first and second points within the game user interface or the virtual reality world comprises producing a representation of the gaming implement within the game user interface or the virtual reality world.

17. The apparatus of claim 14, wherein the micro-motion tracking module, control recognition module, or user representation module is further configured to determine the position of the user.

18. The apparatus of claim 17, wherein the determination of the position of the user is based on a determined displacement of another point of the two or more points of radar field.

19. One or more computer-readable storage media having instructions stored thereon that, responsive to execution by one or more computer processors, cause the processors to:
 receive a radar signal representing a superposition of reflections of two or more points within a radar field provided by a radar system;
 spatially resolve a first point and a second point of the two or more points, at least one of the first or second points being on a portion of a user;
 determine a relative displacement between the first and second points based on the resolving;
 determine a user control action for a gaming or virtual reality application based on the relative displacement between the first and second points; or provide the relative displacement between the first and second points effective to enable determination of the user control action by the gaming or virtual reality application;

determine locations in three dimensions, or relative to the user, of the first and second point based on the resolving; and represent, in a game user interface or a virtual reality world associated with the gaming or virtual reality application, the first and second points; or pass the locations of the first and second points to the gaming or virtual reality application effective to enable the gaming or virtual reality application to represent the first and second points within the game user interface or the virtual reality world.

20. The one or more computer-readable storage media of claim 19, wherein the locations of the first and second points are used to determine a position or orientation of the portion of the user such that the portion of the user can be represented within the game application or virtual reality program.

* * * * *